United States Patent
Miller et al.

[11] Patent Number: 6,117,322
[45] Date of Patent: *Sep. 12, 2000

[54] DYNAMIC FILTER SYSTEM

[75] Inventors: John D. Miller, Ithaca; Stephen Arthur Geibel, Cortland; Mark Francis Hurwitz, Ithaca; Thomas J. Fendya, Homer; Tony Alex, Merrick, all of N.Y.

[73] Assignee: Pall Corporation, East Hills, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/744,476

[22] Filed: Nov. 7, 1996

Related U.S. Application Data

[63] Continuation of application No. 08/272,218, Jul. 8, 1994, abandoned, which is a continuation-in-part of application No. 08/080,215, Jun. 23, 1993, Pat. No. 5,679,249.

[51] Int. Cl.$^7$ .................................................. B01D 65/08
[52] U.S. Cl. ............................... 210/321.63; 210/321.75; 210/334; 210/344; 210/415; 210/489; 210/492
[58] Field of Search ............................... 210/319, 321.68, 210/332, 334, 346, 455, 486, 490, 637, 780, 791, 321.63, 321.67, 391, 413, 414, 415, 321.75, 321.84, 344, 488, 489, 492

[56] References Cited

U.S. PATENT DOCUMENTS

| | | |
|---|---|---|
| 347,275 | 8/1886 | Lord et al. . |
| 1,249,835 | 12/1917 | Salisbury . |
| 1,673,572 | 6/1928 | Liddell . |
| 2,207,618 | 7/1940 | Grill et al. . |
| 2,399,710 | 5/1946 | Schock . |
| 2,885,082 | 5/1959 | Stafford . |
| 2,936,075 | 5/1960 | Davis . |
| 3,064,817 | 11/1962 | Van Der Werff . |
| 3,200,105 | 8/1965 | Barber et al. . |

(List continued on next page.)

FOREIGN PATENT DOCUMENTS

| | | |
|---|---|---|
| 258313 | 11/1967 | Australia . |
| 66111 | 4/1987 | Australia . |
| 1198062 | 12/1985 | Canada . |
| 1323845 | 11/1993 | Canada . |
| 045033 | 7/1981 | European Pat. Off. . |
| 0044524 | 1/1982 | European Pat. Off. . |
| 0045033 | 2/1982 | European Pat. Off. . |
| 066198 | 5/1982 | European Pat. Off. . |
| 0066198 | 12/1982 | European Pat. Off. . |
| 0220324 | 5/1987 | European Pat. Off. . |
| 0226659 | 7/1987 | European Pat. Off. . |
| 0529682 | 12/1988 | European Pat. Off. . |

(List continued on next page.)

OTHER PUBLICATIONS

"How to Keep your Fluid Processing Budget form Going to Waste" AquaTechnology Resource Management, Inc., Date Unknown.

Murkes & Carlsson, "High–Shear Crossflow Filtration", 1988 Chapter 3, pp. 69–124.

CR 500/1000, Membrane Filter, "The New Alternative For Process–Water–Cleaning", ABB ASEA Brown Boveri.

Dahlquist et al., "The CR–Filter, A New Membrane Filter With Rotating Elements", pp. 1–3.

Winzeler, Heinz B. "Membrane–Filtration mit hoher Trennleistung und minimalem Energiebedarf"; Chimia 44 (1990) pp. 288–291.

(List continued on next page.)

*Primary Examiner*—Matthew O. Savage
*Attorney, Agent, or Firm*—Ledig, Voit & Mayer

[57] ABSTRACT

A dynamic filter system includes a dynamic filter assembly including one or more filter elements and one or more members disposed within a housing. The filter elements and the members are interleaved and arranged to rotate with respect to one another. The dynamic filter assembly preferably includes one or more mechanisms to prevent preferential fouling.

60 Claims, 14 Drawing Sheets

U.S. PATENT DOCUMENTS

| | | |
|---|---|---|
| 3,365,065 | 1/1968 | Varjabedian . |
| 3,437,208 | 4/1969 | Kasper et al. . |
| 3,472,765 | 10/1969 | Budd et al. . |
| 3,477,575 | 11/1969 | Nemec et al. . |
| 3,502,575 | 3/1970 | Hepp et al. . |
| 3,606,016 | 9/1971 | Sasaki . |
| 3,623,610 | 11/1971 | Olsen . |
| 3,648,844 | 3/1972 | Krynski et al. . |
| 3,669,879 | 6/1972 | Berriman . |
| 3,764,526 | 10/1973 | King . |
| 3,766,059 | 10/1973 | Sasaki . |
| 3,879,286 | 4/1975 | Berriman . |
| 3,884,805 | 5/1975 | Bagdasarian et al. ................... 210/334 |
| 3,884,813 | 5/1975 | Donovan et al. . |
| 3,948,778 | 4/1976 | Müller . |
| 3,980,562 | 9/1976 | Nilsson . |
| 3,984,317 | 10/1976 | Donovan . |
| 3,989,629 | 11/1976 | Donovan . |
| 3,997,447 | 12/1976 | Breton et al. . |
| 4,025,425 | 5/1977 | Croopnick et al. . |
| 4,066,546 | 1/1978 | Sasaki ..................................... 210/332 |
| 4,093,552 | 6/1978 | Guyer . |
| 4,132,649 | 1/1979 | Croopnick et al. . |
| 4,155,290 | 5/1979 | Da Dalt . |
| 4,156,647 | 5/1979 | Nieuwenhuis . |
| 4,216,094 | 8/1980 | Solum . |
| 4,330,405 | 5/1982 | Davis et al. . |
| 4,335,994 | 6/1982 | Gurth . |
| 4,340,480 | 7/1982 | Pall et al. . |
| 4,376,049 | 3/1983 | Valentine . |
| 4,404,106 | 9/1983 | Müller et al. . |
| 4,430,901 | 2/1984 | Rogers . |
| 4,487,689 | 12/1984 | Galaj . |
| 4,501,663 | 2/1985 | Merrill . |
| 4,514,139 | 4/1985 | Gurth . |
| 4,543,181 | 9/1985 | Greenwood . |
| 4,553,387 | 11/1985 | Mayer . |
| 4,576,715 | 3/1986 | Michaels et al. . |
| 4,631,130 | 12/1986 | Watanabe . |
| 4,655,920 | 4/1987 | Ragnegard . |
| 4,666,603 | 5/1987 | Madsen et al. . |
| 4,695,380 | 9/1987 | Hilgendorff et al. . |
| 4,696,433 | 9/1987 | Lenz et al. . |
| 4,698,156 | 10/1987 | Bumpers . |
| 4,708,797 | 11/1987 | Bauer et al. . |
| 4,717,485 | 1/1988 | Brunsell et al. . |
| 4,740,312 | 4/1988 | Dahlquist et al. ................. 210/321.63 |
| 4,768,920 | 9/1988 | Gurth . |
| 4,773,819 | 9/1988 | Gurth . |
| 4,781,828 | 11/1988 | Kupka . |
| 4,781,835 | 11/1988 | Bahr et al. . |
| 4,790,942 | 12/1988 | Schmidt et al. . |
| 4,816,150 | 3/1989 | Pierrard et al. . |
| 4,844,794 | 7/1989 | Ziller . |
| 4,867,878 | 9/1989 | Rashev . |
| 4,876,013 | 10/1989 | Schmidt et al. . |
| 4,906,379 | 3/1990 | Hodgins et al. . |
| 4,911,847 | 3/1990 | Shmidt et al. . |
| 4,919,806 | 4/1990 | Yagishita . |
| 4,925,557 | 5/1990 | Ahlberg, Jr. et al. . |
| 4,935,002 | 6/1990 | Gordon . |
| 4,940,385 | 7/1990 | Gurth . |
| 4,943,374 | 7/1990 | Heininger et al. . |
| 4,950,403 | 8/1990 | Hauff et al. . |
| 4,968,600 | 11/1990 | Haraguchi et al. . |
| 5,000,848 | 3/1991 | Hodgins et al. . |
| 5,019,255 | 5/1991 | Dahlquist et al. . |
| 5,034,135 | 7/1991 | Fischel . |
| 5,084,220 | 1/1992 | Moller . |
| 5,114,588 | 5/1992 | Greene . |
| 5,143,616 | 9/1992 | Pall et al. . |
| 5,143,630 | 9/1992 | Rolchigo ................................. 210/486 |
| 5,192,434 | 3/1993 | Moller . |
| 5,200,076 | 4/1993 | Salyer . |
| 5,215,663 | 6/1993 | Greene . |
| 5,254,250 | 10/1993 | Rolchigo et al. . |
| 5,275,725 | 1/1994 | Ishii et al. . |
| 5,298,016 | 3/1994 | Gordon . |
| 5,415,781 | 5/1995 | Randhahn et al. .................. 210/321.63 |

FOREIGN PATENT DOCUMENTS

| | | |
|---|---|---|
| 0324865 | 7/1989 | European Pat. Off. . |
| 0338433 | 10/1989 | European Pat. Off. . |
| 0370118 | 5/1990 | European Pat. Off. . |
| 0319564 | 10/1992 | European Pat. Off. . |
| 0529682 | 3/1993 | European Pat. Off. . |
| 560281 | 9/1993 | European Pat. Off. . |
| 0304833 | 6/1994 | European Pat. Off. . |
| 0443469 | 2/1995 | European Pat. Off. . |
| 2021564 | 7/1970 | France . |
| 2203664 | 5/1974 | France . |
| 2386330 | 3/1978 | France . |
| 2578440 | 9/1986 | France . |
| 2446157 | 4/1976 | Germany . |
| 89 12 282 U | 3/1990 | Germany . |
| 4015187 | 11/1990 | Germany . |
| 63688 | 5/1995 | Ireland . |
| 58-45766 | 10/1983 | Japan . |
| 59-28121 | 1/1984 | Japan . |
| 63-205106 | 2/1987 | Japan . |
| 62-97604 | 5/1987 | Japan . |
| 62-97605 | 5/1987 | Japan . |
| 62-97607 | 5/1987 | Japan . |
| 62-148301 | 9/1987 | Japan . |
| 62-148302 | 9/1987 | Japan . |
| 62-151904 | 9/1987 | Japan . |
| 62-151906 | 9/1987 | Japan . |
| 62-213808 | 9/1987 | Japan . |
| 62-213809 | 9/1987 | Japan . |
| 62-213810 | 9/1987 | Japan . |
| 62-213811 | 9/1987 | Japan . |
| 62-269708 | 11/1987 | Japan . |
| 63-252518 | 10/1988 | Japan . |
| 63-252519 | 10/1988 | Japan . |
| 1139114 | 5/1989 | Japan . |
| 192210 | 6/1989 | Japan . |
| 1270916 | 10/1989 | Japan . |
| 1297104 | 11/1989 | Japan . |
| 62-279807 | 12/1989 | Japan . |
| 2187101 | 7/1990 | Japan . |
| 2187102 | 7/1990 | Japan . |
| 2142606 | 12/1990 | Japan . |
| 311428 | 2/1991 | Japan . |
| 341785 | 9/1991 | Japan . |
| 341786 | 9/1991 | Japan . |
| 4281829 | 10/1992 | Japan . |
| 4122634 | 11/1992 | Japan . |
| 523194 | 2/1993 | Japan . |
| 5228348 | 9/1993 | Japan . |
| 591203 | 2/1978 | Russian Federation . |
| 22560 | of 1912 | United Kingdom . |
| 1057015 | 2/1967 | United Kingdom . |
| 1282629 | 7/1972 | United Kingdom . |
| 1525071 | 9/1978 | United Kingdom . |
| 2173421 | 10/1986 | United Kingdom . |
| 2201355 | 9/1988 | United Kingdom . |
| WO 86/06006 | 10/1986 | WIPO . |
| 88 10144 | 12/1988 | WIPO . |
| 89 05181 | 6/1989 | WIPO . |
| 93 12859 | 7/1993 | WIPO . |
| 95 00231 | 5/1995 | WIPO . |

OTHER PUBLICATIONS

Discflo Pumps, "The Proven Cost Effective Answer To Difficult Pumping Problems".

Erik Dahlquist et al., "New Developments In High Shear Crossflow Membrane Filtration", Fluid Particle, 1991, pp. 118–133.

"Continuous Pressure Filter"; Ingersoll–Rand, Industrial Process Machinery.

Nashua, N.H., "Artisan Dynamic Thickener/Washer", Ingersoll–Rand Industrial Process Machinery Bulletin No. 4081.

Nashua, N.H., "Artisan Continuous Filter For The Processing Industries"; Ingersoll–Rand; Industrial Process Mach. Bulletin 4060.

Nashua, N.H., "Continuous Pressure Filter"; Ingersoll–Rand; Industrial Process Machinery.

Cheng, K.S., Ph.D., "Thin Cake Filtration: Theory & Practice"; Batelle Press; Columbus, OH; pp. 42–50; 1990.

J. Snowman, "Sealing Technology In Lyophilizers"; Edwards High Vacuum International; pp. 81–86.

Bruce E. Hammer et al., "Quantitative Flow Measurements . . . "; Biotechnology, Vo. 8, pp. 327–330, Apr. 1990.

Kramer—Rotorfilter; Walter Kramer, GmbH.

R. Wisniewski, "Anticipated Effects of Seal Interface Operating Conditions On Biological Materials"; Gentech, Inc.; pp. 87–96.

Alan O. Lebeck, "Principles and Design of Mechanical Face Seals" Mechanical Seal Technology, Inc.; 1991.

D.L. Todhunter, "Improving the Life Expectancy of Mechnical Seals in Aseptic Service"; The Seal Source; pp. 97–103.

Ivo M. Fodor, "Mechanical Seals: Design Solutions for Trouble Free Sterile Applications"; Dynamic Engineering, Ltd., pp. 89–98.

S. Wronski et al., "Dynamic Filtration in Biotechnology"; Bioprocess Engineering, vol. 4, 1989, pp. 99–104.

S. Wronski et al., "Resistance Model for High–Shear Dynamic Microfiltration"; Proceedings of the Filtration Society; 1989.

"Bioprocess Engineering"; Warsaw University of Technology Institute of Chemical & Process Engineering; Jun. 30, 1989.

E. Moiga et al., "Dynamic Filtration in Obtaining of High Purity Materials . . . "; Filtration & Separation, Oct. 1988.

S. Wronski, "Filtracja Dynamiczna Roztworow Polimerow"; Inzynieria I Aparatura Chemiczna.

S. Wronski, "Problems of Dynamic Filtration"; Prace Instytutu Inzynierii Chemicznes, pp. 6–24.

M. Shirato et al., "Patterns of Flow in a Filter . . . "; International Chemical Engineering, vol. 27, No. 2, Apr. 1987.

K. Watanabe, "Experiments on the Fluid Friction of a Rotating Disc with Blades"; vol. 5, No. 17, pp. 49–57, 1962.

S. Wronski et al., "Power Consumption in Dynamic Disc Filters"; Institute of Chemical Engineering, Warsaw Tech. Univ., 1994.

N. Schweigler et al., "High Performance Disc Filter for Dewatering Mineral Slurries"; Filtration Society at Filtech, 89.

G. Parkinson, "Novel Separator Makes It's Debut"; Chemical Engineering, Jan. 1989.

"SpinTek Introduces Small Centrifugal Crossflow UF System"; Membrane & Separation Technology News; vol. 10, No. 12, Aug., 1992.

"DMF Dynamic Membrane Filter"; Pall Corporation, Advanced Separations Systems, 6 pages.

"Solid–Liquid Separation." *Chemical Engineering,* Jun. 30, 1979: vol. 86, No. 16, pp. 73–76.

"Novel Solid–Liquid Separation Processes." *Perry's Chemical Engineering Handbook,* 6th ed. McGraw–Hill, 1984, pp. 17/51–54.

J. Snowman, "Sealing Technology In Lyophilizers"; Edwards High Vacuum International; pp. 81–86.

Bruce E. Hammer et al.; "Quantitative Flow Measurements In Bioreactors by Nuclear Magnetic Resonance Imaging"; Biotechnology vol. 8, pp. 327–330, Apr. 1990.

R. Wisniewski, "Anticipated Effects of Seal Interface Operating Conditions on Biological Materials"; Genetech, Inc.; pp. 87–96.

Alan O. Lebeck, "Principles and Design of Mechanical Face Seals"; Mechanical Seal Technology, Inc.; 1991.

D. L. Todhunder, "Improving the Life Expectancy of Mechanical Seals in Aseptic Service"; The Seal Source; pp. 97–103.

Ivo M. Fodor, "Mechanical Seals: Design Solutions for Trouble Free Sterile Applications"; Dynamic Engineering Ltd., pp. 89–98.

S. Wronski et al., "Dynamic fltration in biotechnology"; Bioprocess Engineering 4 pp. 99–104 (1989).

S. Wronskoi et al., "Resistance Model for High–Shear Dynamic Microfiltration"; Proceedings of the Filtration Society; 1989.

"Bioprocess Engineering"; Warsaw University of Technology Inst. of Chemical and Process Engineering; Jun. 30, 1989.

E. Moiga et al., "Dynamic Filtration in Containing of High Purity Materials—Modelling of the Washing Process"; Filtration and Separation, Oct. 1988.

M. Shirato et al., "Patterns of flow in a filter chamber during dynamic filtration with a grooved disk"; International Chemical Engineering, vol. 27, No. 2, Apr. 1987.

K. Watabe, "Experiments on the Fluid Friction of a Rotating Disc with Blades"; vol. 5, No. 17, pp. 49–47, 1962.

S. Wronski et al., "Power Consumption in Dynamic Disc Filters"; Inst. of Chemical Engineering, Warsaw Tech. Univ., 1994.

N. Schweigler et al., "High Performance Disc Filter for Dewatering Mineral Slurries"; Filtration Society at Filtech 89.

G. Parkinson, "Novel separator makes its debut"; Chemical Engineering; Jan. 1989.

"SpinTek Introduces Small Centrifugal Crossflow UF System"; Membrane & Separation Technolocy News: vol. 10, No. 12, Aug. 1992.

AquaTechnology, Resource Management, Inc. "How to keep your fluid processing budget from going to waste"; AquaTechnology.

"DMF Dynamic Membrane Filter"; Pall Corporation.

"Continuous Pressure Filter"; Ingersoll–Rand.

"Kramer—Rotorfilter"; Walter Krämer GmbH.

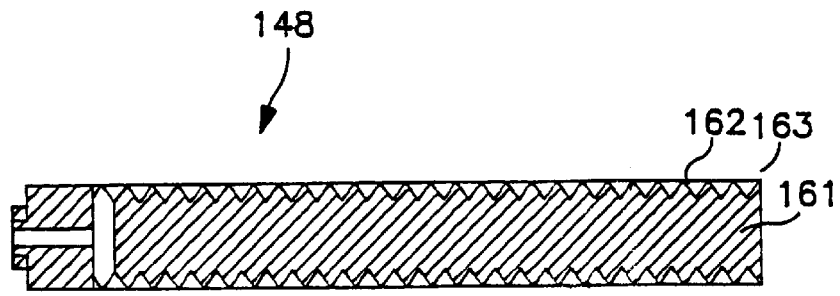
FIG. IIA
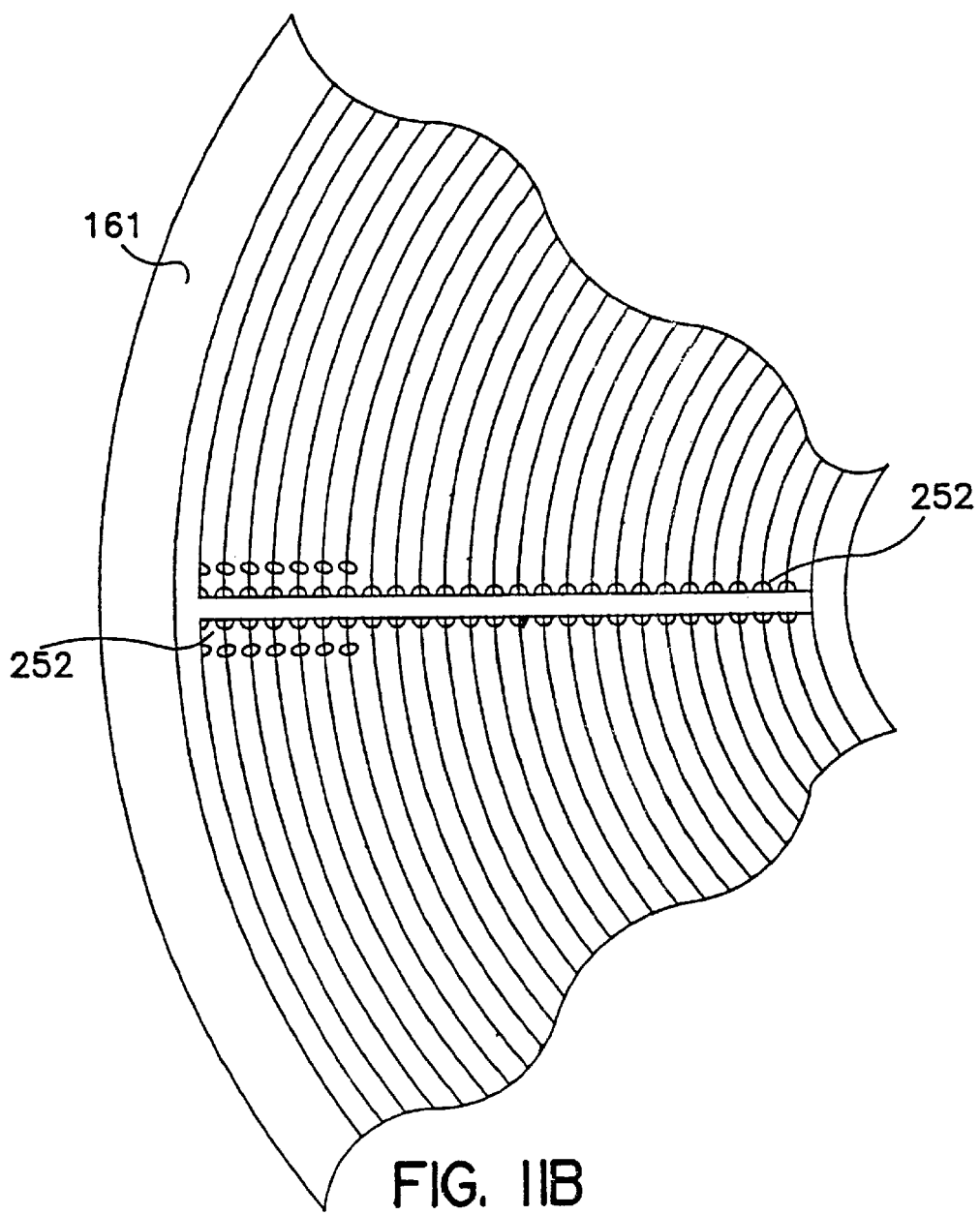
FIG. IIB

DYNAMIC FILTER SYSTEM

This disclosure is a continuation of patent application Ser. No. 08/272,218, filed Jul. 8, 1994, now abandoned.

This application is a continuation-in-part of U.S. application Ser. No. 08/080,215 filed on Jun. 23, 1993, now U.S. Pat. No. 5,679,249 which is hereby incorporated by reference.

TECHNICAL FIELD

The present invention relates to a dynamic filter assembly and, in particular, to an improved dynamic filter assembly and filter unit.

BACKGROUND OF THE INVENTION

A dynamic filter assembly typically includes a housing which contains a filter unit having one or more filter elements positioned adjacent to an element having one or more members. In typical embodiments, there is a relative motion between the filter elements and the members, e.g., rotational motion. The filter elements and the members may have any of a variety of suitable configurations. For example, the filter unit may include a stack of substantially flat, disk-shaped filter elements while the element may include a stack of substantially flat rotary disks or members coupled to a shaft. The rotary disks may be interleaved between the filter elements with a gap maintained between each filter element and rotary disk. The rotary disks preferably rotate relative to the filter elements.

In typical embodiments, a process fluid is input into the housing through a process fluid inlet and then passes through the gaps between the rotary disks and the filter element. While the process fluid is in the housing, it may be preferable to maintain a relative rotation between the filter elements and the members. The permeate passes through the filter elements and exits the housing through a permeate outlet. The remainder of the process fluid, i.e, the retentate or concentrate, exits the housing through a retentate/concentrate outlet.

The relative rotation of the members and the filter elements causes the process fluid in the gaps between the members and the filter elements to sweep the surface of the filter elements. Debris are thus prevented from accumulating on the surface of the filter elements and fouling or clogging of the filter elements is minimized. This extends the useful life of the filter elements.

DISCOVERY OF THE INVENTION

In some embodiments, a pump or other pressurizing mechanism may be used to pressurize the process fluid side of the dynamic filter system to a system pressure $P_S$. The system pressure $P_S$ is typically a uniform pressure applied to the upstream side of the filter elements. Pressure on the process fluid side is also affected by the relative rotation between the filter elements and the members. The process fluid side pressure may be approximated by the following equation:

$$P_c(r) = P_s + \frac{\rho}{8}\Omega^2 r^2$$

Where:
$\Omega$=Angular Velocity of the Member
$\rho$=Fluid Density
r=Radial Position The transmembrane pressure $P_{tm}$ for the case where there is no rotation is simply $P_S-P_a$ (where $P_a$ is the permeate outlet pressure). In the case where there is a relative rotation between the members and the filter elements, the relative rotation causes an additional component of the transmembrane pressure to develop. A simple model of the transmembrane pressure may be developed in which the transmembrane pressure depends on, for example, the extent to which the permeate valve is open, fluid density, fluid viscosity, dimensions of the filter element e.g., inner and outer radii, the flow coefficient, and any flow restricting mechanism in or around the filters including membrane permeability and substrate permeability, e.g., groove and duct dimensions, and/or other permeability altering mechanisms.

The specific constants for the general transmembrane pressure equation may be calculated for various filter element shapes and configurations. For example, an approximation of the transmembrane pressure may be calculated for a grooved D-shaped filter having an inner radius $R_i$, an outer radius $R_o$, and rectangular grooves having width W and pitch L. Assuming the flow resistance of the permeate side is due entirely to a value at the permeate outlet, a simple model of the transmembrane pressure can be derived. If the flow resistance of the permeate side is zero when the permeate valve is open and infinite when permeate valve is closed, the transmembrane pressure for a given radial position r along the grooved, D-shaped filter element may be approximated by the following equations:

$$P_{tm}(r) = \begin{cases} P_s - P_a + \frac{\rho}{8}\Omega^2 r^2 & \text{Permeate Valve: Open} \\ \frac{\rho}{16}\Omega^2(2r^2 - R_0^2 - R_i^2) & \text{Closed} \\ \frac{P_s - P_a}{1 + \frac{k_m\psi}{\mu C_v}} + \frac{\rho}{8}\Omega^2\left(r^2 - \frac{\frac{1}{2}(R_o^2 + R_i^2)}{1 + \frac{\mu C_v}{k_m\psi}}\right) & \text{Partly Open} \end{cases}$$

Where:

$$\psi = \frac{\pi\omega}{L}(R_o^2 - R_i^2)$$

$\rho$=Fluid Density
$k_m$=Membrane Permeability
Cv=Flow Coefficient
$\mu$=Fluid Viscosity An important result of the above calculations is that the transmembrane pressure may be negative at the inner radius when the permeate valve is either closed or partially closed or if there is significant restriction in the flow of permeate. The pressure on the process fluid side increases quadratically with increasing radius. With the permeate valve closed, the pressure on the permeate side of the filter element is equal to the average of the pressures at the inner radius and the pressure at the outer radius on the process fluid side. Thus, with the permeate valve closed, the transmembrane pressure at the inner radius will be negative with respect to the transmembrane pressure at the outer radius.

In this embodiment, the greatest negative pressure will be at the inner most radial position of the filter element. Progressing outward from the inner radius toward the outer radius, there is a radial position (termed the crossover point) at which the transmembrane pressure is zero and the pressure on the process fluid side equals the pressure on the permeate side. From the crossover point to the inner radius, the negative transmembrane pressure increases until the inner radial position is reached. From the crossover point to the outer radius, the positive transmembrane pressure increases until the outer radial position is reached. The radial position at which the cross-over point is reached may be calculated for various filter configuration by setting the transmembrane pressure to zero and solving for r. For the case where the permeate valve is shut, the cross-over point is simply:

$$r_{crossover\ point} = \sqrt{\frac{1}{2}(r_o^2 + R_i^2)}$$

As a result of the above described pressure imbalance, permeate flowing through the filter at the outer portion of the filter element (i.e., from the cross-over point to the outer radius $R_o$) recirculates back through the filter to the process fluid side at the inner portion of the filter element (i.e., from the cross-over point to the inner radial position $R_i$). A large recirculation flow between the inner and outer portions of the filter elements may serve to foul the filter along the outer radius. Thus, there is a problem of how to prevent fouling at the outer portion of the filter element and/or prevent back pressure damage to the inner radial portion of the filter element when the permeate outlet valve is fully or partially closed such that the permeate side pressure exceeds the process fluid side pressure produced along the inner radius.

Fouling of the filter elements may be caused by the accretion of solid phase material on the filter media as the process fluid flows through the filter media. The flow rate of the process fluid through the filter media is a function of the transmembrane pressure, and hence the flow rate increases with increasing disc spin rate and increasing radial position. However, the fouling of the membrane increases less rapidly than the increase in the flow rate due to the increased shear at the outer radius. The relative rotation between the filter elements and the members creates a shearing layer between the filter elements and a block of fluid that spins as if it was a rigid body. The shearing layer provides a lift force on particles in the fluid.

The transmembrane pressure drives fluid and the particles in the fluid towards the membrane. The larger the transmembrane pressure, the faster the fluid and the particles are driven towards the membrane. The shear near the membrane provides a lift force on the particles only. And that lift force tends to move the particles away from the membrane. The bigger the particle, or the larger the shear force, the more lift there is. As a result, there is a partial balancing between the transmembrane pressure force that is driving a particle towards the membrane and the lift force or shear that is driving the particle away from the membrane. However, to the extent that the increased flow at the outer radius exceeds the increased shear, fouling occurs. The fouling may start at the outer radius and proceed inward. However, in some dynamic filter assemblies, e.g., spinning filters with out interleaved members, preferential fouling may occur along the inner radius.

The flow increases with increasing radius, e.g., proportional to $r^2$. This increase is partially balanced by the increasing shear force which increases at a power less than $r^2$. For example, in some applications, the shear may increase only with the 3/2 power. Hence, although the flow through the membrane increases with a square of the radius, the partial balancing of the shear force causes the fouling of the membrane to increase at a slower rate with increasing radius. Accordingly, devices and methods are required to prevent preferential fouling (particularly along the outer radius) of the membranes in dynamic filter assemblies.

The preferential fouling, including preferential fouling at both the inner and/or outer radius of the filter elements, may be adverted by various mechanisms including adjusting the permeability and/or flow through the filter elements. In some embodiments, it may be desirable to use empirical tests to determine the location and/or amount of the preferential fouling. Accordingly, the permeability and/or fluid flow through different portions of the filter element may be adjusted to reduce and/or eliminate the preferential fouling. In some embodiments, it may be desirable to empirically retest the adjusted filter elements to verify that the preferential fouling is eliminated or reduced. Any necessary readjustments may be made after the filter elements are retested. Further, it may be desirable to determine the minimum amount of permeability and/or flow reduction which prevents preferential fouling in order to maximize the flow of permeate while minimizing preferential fouling.

Thus, while conventional disk-type dynamic filter assemblies have proven very effective, they nevertheless have several disadvantages. For example, conventional disk-type dynamic filter assemblies may exhibit preferential fouling at one or more locations on the filter assemblies, and particularly at the outer circumference or along an outer annular ring. Further, conventional disk-type dynamic filters often require a high system pressures so that the increased pressure at the outer radius is a small percentage of the overall system pressure. Additionally, the filter elements in many dynamic filter systems may become permanently fouled by the dynamic filter start-up procedure.

One problem with full speed operation with a clean membrane without any flow restriction is that there is a large flow at the outer periphery of the filter elements due to the large transmembrane pressure. This large flow may cause permanent fouling upon start-up unless one or more flow restricting mechanisms are utilized.

SUMMARY OF THE INVENTION

A principal object of the present invention is to provide a dynamic filter assembly which solves or minimizes the above problems. Additional objects are (1) to provide a filter unit having a predetermined start-up procedure to minimize permanent fouling; (2) to provide a dynamic filter assembly which utilizes a wide variety of materials to meet the requirements of the filtering process and which accommodates the dissimilar materials without impairing the function of the dynamic filter assembly; (3) to provide a filter unit having a substantially uniform fouling throughout the membrane; (4) to control the start-up of the dynamic filter system; (5) to control the back-pressure conditions; and (6) to include structures and processes which enable flow through different regions of the filter elements to be controlled.

Accordingly, a dynamic filter assembly according to the present invention includes a housing including a process fluid inlet and a permeate outlet. A filter unit is disposed within the housing and includes a plurality of filter elements. A member is also disposed within the housing and opposes at least one of the filter elements. The member and the filter are arranged to rotate relative to one another to resist fouling of the filter elements. The filter elements have an upstream side which communicates with the process fluid inlet and a downstream side which communicates with the permeate outlet. Each filter element includes a mechanism restricting fluid flow to prevent preferential fouling of the filter element.

BRIEF DESCRIPTION OF THE DRAWINGS

FIG. 11A is a sectioned side view and

FIG. 11B is a top plan view of an exemplary embodiment of a filter element according to the present invention;

DESCRIPTION OF EMBODIMENTS

Figure 1:
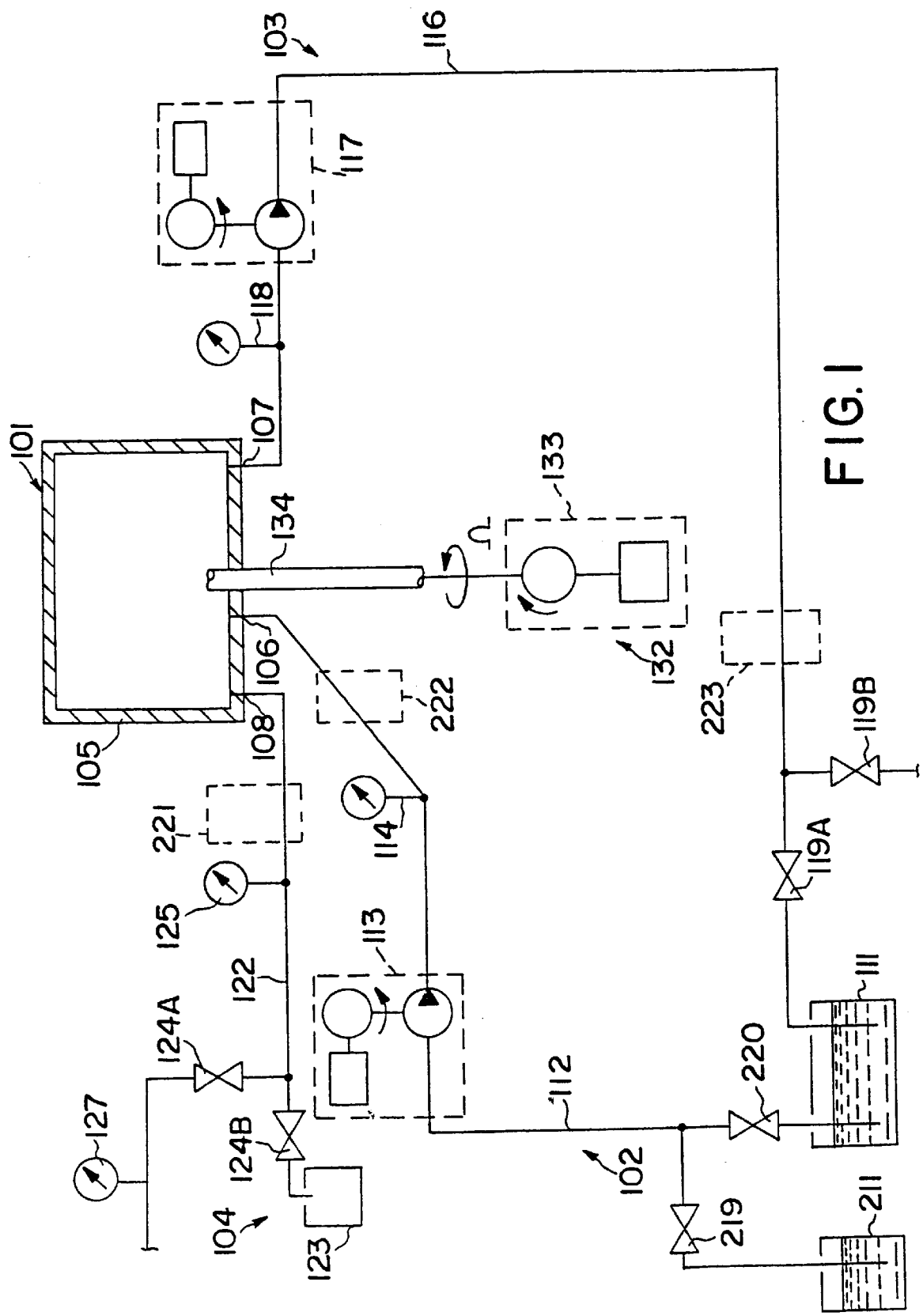
FIG. 1 is a schematic view of a dynamic filter system according to the present invention.

As shown in FIG. 1, a dynamic filter system of the present invention may include a dynamic filter assembly 101, a process fluid feed arrangement 102, a retentate recovery arrangement 103, and a permeate recovery arrangement 104. The dynamic filter assembly 101 generally comprises a housing 105 having a process fluid inlet 106, a retentate outlet 107, and a permeate outlet 108. The dynamic filter assembly 101 includes one or more filter elements and one or more members which are interleaved within the housing and arranged to rotate relative to one another.

The process fluid feed arrangement 102 is connected to the process fluid inlet 106 of the dynamic filter assembly 101 and may include a tank, vat, or other container 111 of process fluid which is coupled to the process fluid inlet 106 via a feed line 112. The process fluid feed arrangement 102 may also include a pump assembly 113 which can comprise a positive displacement pump in the feed line 112 for transporting the process fluid from the container 111 to the dynamic filter assembly 101. A pressure sensor 114 may also be included in the process fluid feed arrangement 102.

The process fluid feed arrangement 102 may also include a buffer tank, vat, or other container 211 of buffer fluid which is coupled to the process fluid inlet 106 via a feed line 112. The pump assembly 113 may also transport the buffer solution from the container 211 to the dynamic filter assembly 101.

In alternative embodiments, the process fluid and buffer solution may be supplied from any suitable pressurized source and/or flow control arrangement in addition to or instead of the pump assembly 113. Additionally, the process fluid feed arrangement may include one or more control valves 219, 220 and/or flow meters 222 for controlling the flow of process fluid and/or buffer solution through the feed line to the process fluid inlet of the dynamic filter assembly.

The retentate recovery arrangement 103 is coupled to the retentate outlet 107 of the dynamic filter assembly 101. Where the dynamic filter system is a recirculating system and is designed to repeatedly pass the process fluid through the dynamic filter assembly 101, the retentate recovery arrangement 103 may include a retentate return line 116 which extends from the retentate outlet 107 to the process fluid container 111. Valves 119A and 119B may be coupled to the retentate return line 116. Valves 119 may regulate the flow of retentate and/or direct the retentate to a separate retentate container and/or away from the dynamic filter system. The retentate recovery arrangement 103 may also include a pump assembly 117 which can include a positive displacement pump for transporting the retentate from the dynamic filter assembly 101 to the process fluid container 111. Alternatively, the retentate recovery arrangement may include, in addition to or instead of the pump assembly, one or more control valves, flow meters 223, and pressure sensors 118 coupled to the retentate return line.

The permeate recovery arrangement 104 is coupled to the permeate outlet 108 of the dynamic filter assembly 101 and may include a permeate recovery line 122 which extends from the permeate outlet 108 to a permeate container 123. One or more valves 124A–124B may be coupled to the permeate recovery line 122 to direct the permeate away from the dynamic filter system. Further, pressure sensors 125, 127 may also be included in the permeate recovery arrangement 104.

The permeate recovery arrangement may include a pump assembly coupled to the permeate recovery line 122 for withdrawing permeate from the dynamic filter assembly. For example, a constant displacement pump or other arrangement may be used to establish a substantially constant flux across the filter elements of the dynamic filter assembly 101, which may be useful in continuous or long-run operations.

Transmembrane pressure across the filter elements can be minimized initially and then allowed to increase over time as the filter elements gradually foul. Alternatively, the permeate recovery arrangement 104 may include, in addition to or instead of the pump assembly, one or more control valves 124A, 124B and flow meters 221 coupled to the permeate line.

In preferred embodiments, the relative rotation between the filter elements and the disk members is produced by a rotational unit 132 which includes a motor assembly 133 coupled to a shaft 134.

A controller may optionally be coupled to each of the elements in FIG. 1 to provide control of the dynamic filter system. In some embodiments, a controller is not required and/or the control functions may be performed manually by an operator. If a controller is included, the controller may, for example, include any digital and/or analog control arrangement including discrete logic, a feedback control system, a microcontroller or other processing arrangement such as a microprocessor or digital sequence controller.

Additionally, the dynamic filter system may be variously configured to include other subsystems such as, for example, a barrier fluid seal arrangement including rotary seals, a sterilization and/or cleaning arrangement, a heat exchange arrangement, and a transport apparatus to move the dynamic filter assembly.

Figure 2:
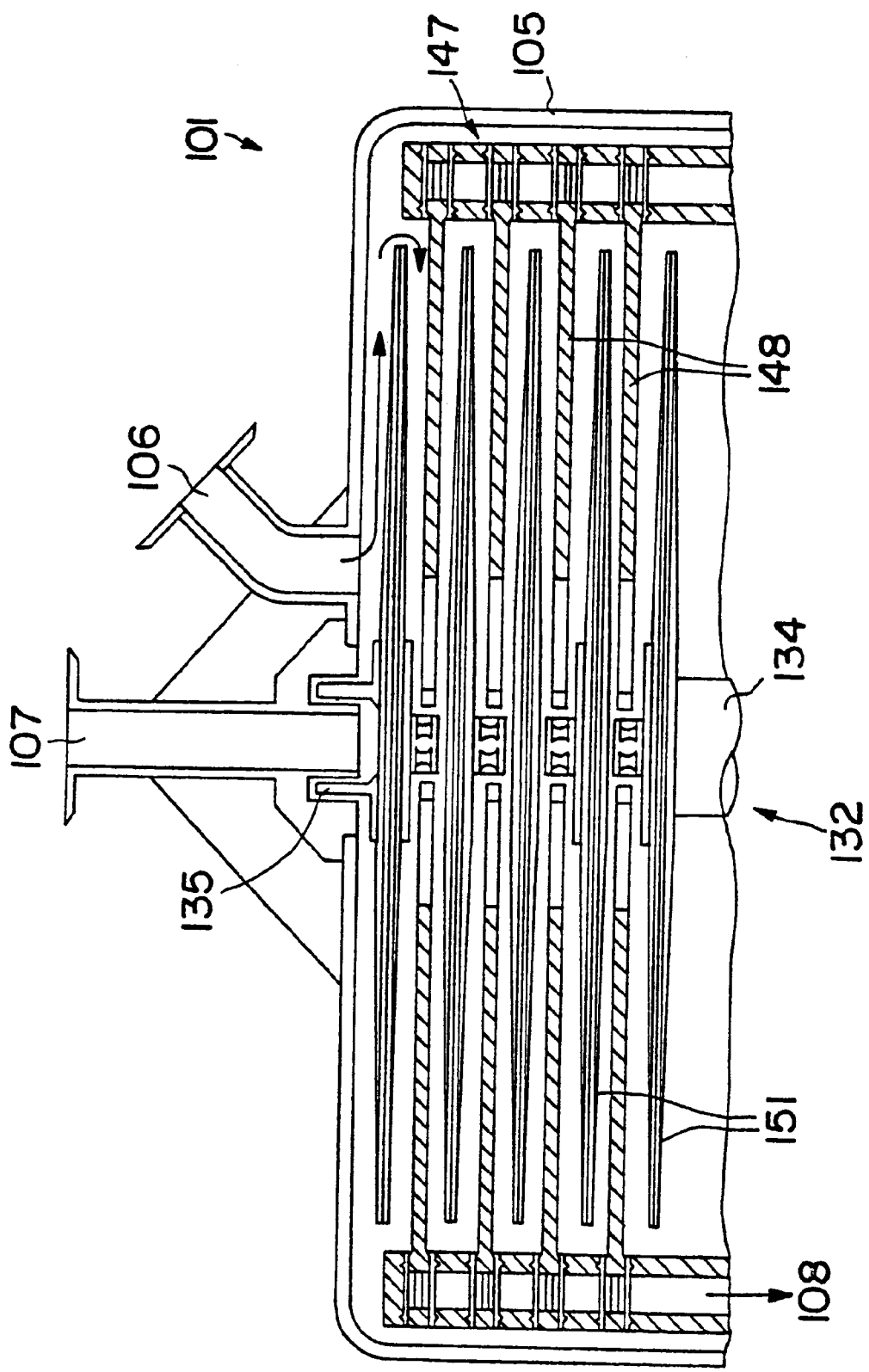
FIG. 2 is a partially sectioned elevation view of one embodiment of the dynamic filter assembly of FIG. 1.

As shown in greater detail in FIG. 2, a preferred embodiment of the dynamic filter assembly 101 preferably comprises a housing 105, a filter unit 147, preferably stationary, and including one or more filter elements 148, and a rotational unit 132 having one or more members 151 (preferably disc shaped) which are mounted to a central shaft 134 and are interleaved with the filter elements 148. A barrier seal 135 may alternatively be included. This is especially useful when the inlet is close to the concentrate outlet as in FIG. 2.

The dynamic filter assembly may comprise filter elements 148 attached to a rotating housing and members attached to a rotating shaft 134, or filter elements 148 attached to a stationary or a rotating shaft and members attached to a stationary or a rotating housing. If the filter elements 148 are attached to a rotating housing, it may be desirable to utilize the centrifugal forces generated in the permeate to create a radially differential back pressure on the filter elements 148 to partially balance the transmembrane pressure and substantially prevent preferential fouling. In some embodiments, one or more orifices may be included in the permeate outlet path such that the flow can be controlled and utilized to prevent preferential fouling.

In one preferred embodiment, only the members 151 rotate while the filter elements 148 remain stationary. Using stationary filter elements 148 while attaching the members 151 to a central rotating shaft 134 simplifies the construction of the rotational unit 132 and its interface with the housing 105. However, additional elements and/or steps may be required to reduce or eliminate preferential fouling.

The housing 105 may be configured in a variety of ways. For example, it preferably has a generally cylindrical configuration which may be contoured to the filter unit 147 in order to minimize hold-up volume or not contoured to the filter unit 147 to facilitate various seal arrangements. The process fluid inlet, the retentate outlet, and the permeate outlet may be located at any suitable point in the housing 105. For example, the process fluid inlet may comprise a series of ports on one side of the housing while the retentate outlet comprises a series of ports on the opposite side of the housing 105. The fluid flow may be variously configured. For example, where fluid flow is directed along or through the shaft 134, the process fluid inlet or the retentate outlet may comprise the opening in the side of the housing 105 which accommodates the shaft 134. The permeate outlet 108 is preferably located at a convenient juncture between the housing 105 and the filter unit 147.

Configuring the dynamic filter assembly to introduce the process fluid into the housing on a side of a spinning member that does not abut a filter element 148, e.g., at the bottom of the rotational unit or at the top of the rotational unit as shown in FIG. 2, may reduce fouling of the filter elements 148. In this manner, the process fluid progresses radially out from the spinning member, then turns, and comes back between the filter element 148 and the plate 161. Thus, before the filter element 148 is subjected to the process fluid, the process fluid is spinning at its full speed.

Figure 3:
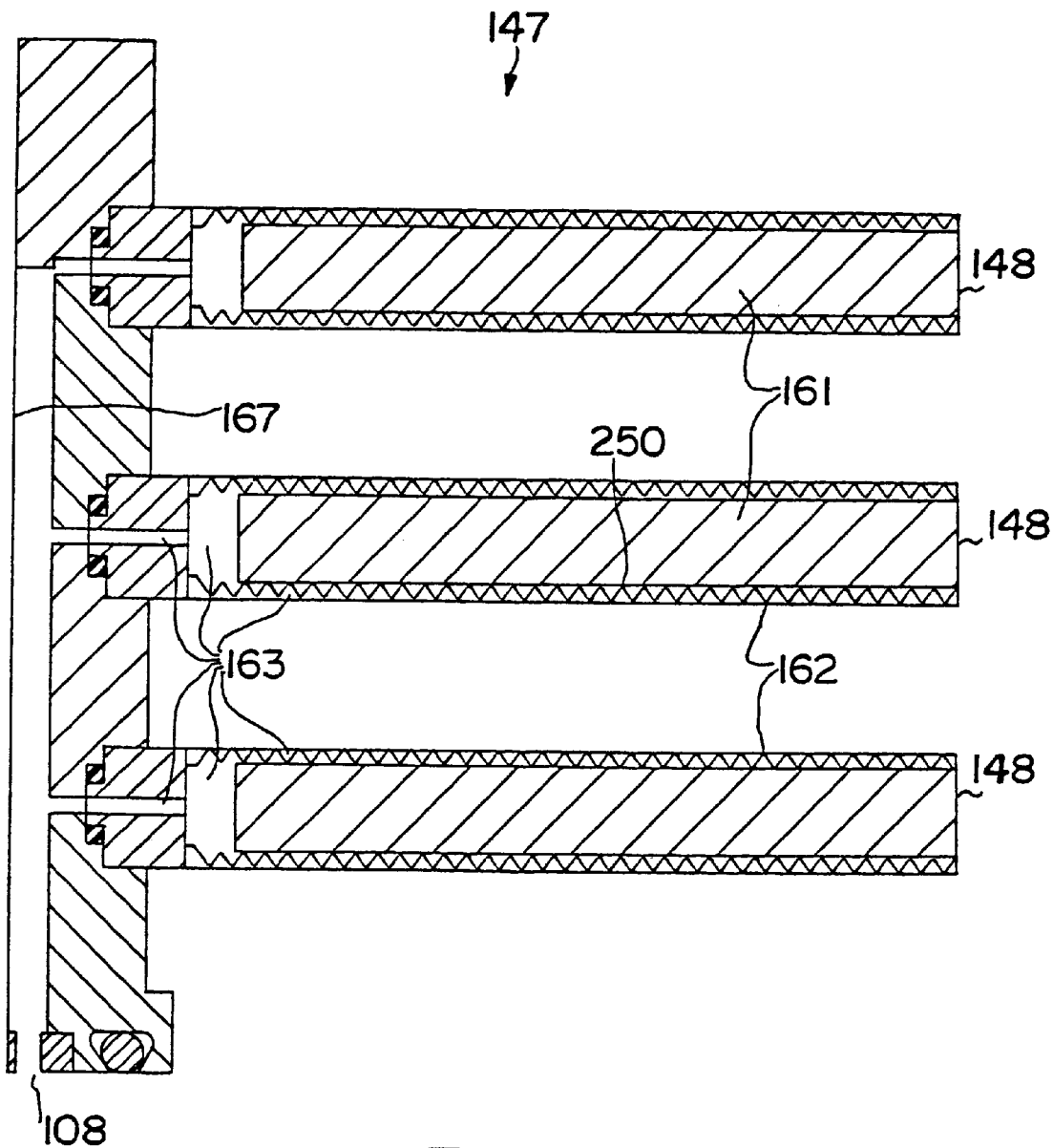
FIG. 3 is a partially sectioned side view of one embodiment of a filter unit of the dynamic filter assembly of FIG. 1.

In the embodiment shown in FIG. 3, each filter element 148 may comprise a substantially rigid plate 161 and at least one but preferably two filters 162 respectively mounted on opposite sides of the plate 161. A porous substrate 250 may also be mounted between the rigid plate 161 and each filter 162.

In the embodiment shown in FIG. 3, the filter elements 148 may be removably mounted to the holder 167. The holder may serve many functions. For example, it may serve to support the filter elements 148 in a stacked configuration, anchor the filter unit 147 to the housing, maintain the filter elements 148 properly spaced from another, and/or provide drainage of the permeate from the filter elements 148 to the permeate outlet.

The plate 161 may comprise any suitably substantially rigid material which provides sufficient structural integrity and which is compatible with the process fluid including polymers, metals, ceramics, and/or glass. For example, the plate 161 may comprise a rigid polymeric material such as nylon and/or polysulfones. In addition, the plate 161 may include a reinforcement such as oriented glass fibers dispersed in the polymeric material or an integral metal support. This reinforcement provides additional structural integrity. It also provides dimensional stability by resisting expansion of the plate 161 due to temperature or moisture absorption.

Passages 163 allow the permeate to drain from the filter 162. Passages 163 may include through-holes, channels (including V-shaped, rectangular, and/or irregular shaped circumferential and/or radial grooves formed in the plate 161), and substrate materials disposed between the filter 162 and the plate 161. In some embodiments, one or more pieces of permeable material may be disposed in the passages 163 to modify the permeability of the passages 163. Additionally, the passages 163 in the plate 161 may be contoured to minimize back pressure on the filters 162 and balance transmembrane pressure. The plate 161 may further include flats on its surfaces and edges to facilitate mounting the filter 162.

The plate 161 may be variously configured. For example, the plate 161 may include one or more circumferential grooves in fluid communication with one or more radial grooves or passages 163. Alternatively, any plate 161 structure may be utilized which is compatible with the particular filter 162 and/or substrate 250. Of course the plate 161 is not limited to radial or concentric grooves but may include any surface configuration such as a rough, smooth, mesh, checkered, diamond, triangular, and/or other contoured or non-contoured surface configuration which allows drainage of the permeate.

The filters 162 of the filter unit 147 each include an upstream side which communicates with the process fluid and a downstream side which communicates with the permeate and, therefore, divide the housing in two chambers, one chamber containing the process fluid and the other chamber containing the permeate. Each filter 162 may comprise any suitable porous filter media, including a porous metal media, e.g., sintered metal particles, a porous ceramic medium, porous polymeric medium, a fibrous medium, and/or a woven or non-woven porous membrane mounted to at least one surface of the plate 161. The size and distribution of the pores of the filter 162 may be selected to meet the requirements of any particular application. The filter 162 may be mounted to the surface of the plate 161 in any suitable manner, including heat-sealing, welding, or by means of a solvent or an adhesive.

In accordance with the present invention, permeability of each of the filter elements 148 is varied in order to adjust the flow through the filter elements 148 such that preferential fouling is prevented or retarded. In some embodiments the permeability of the filter element 148 may be substantially matched to radial fouling characteristics of the filter element 148. In other embodiments, a linear and/or step-wise adjustment in the permeability of the filter elements 148 may be sufficient to substantially prevent preferential fouling. To vary the permeability of the filter element 148, it may be preferable to modify the permeability of the filter 162, the substrate 250, and/or the plate 161.

The permeability of the filter and/or substrate may be modified by adjusting the thickness, the solid volume fraction, and/or the pore size. The solid volume fraction is the fraction of solid material to the total volume. The permeability of the filter 162 and/or substrate 250 may be modified by, for example, radially varying the permeability. The radially varied permeability may be accomplished with either a uniform or variable thickness filter 162 and/or substrate 250. The size of the pores and/or the solid volume fraction in the filter 162 and/or substrate 250 may be selected to meet the requirements of any particular application, and may be radially graded across the surface of the filter element 148. In exemplary embodiments, it may be desirable to increase the solid volume fraction with increasing radius.

The substrate 250 may, for example, include a micro or macro porous woven or non-woven sheet including fibrous sheets. The substrate 250 and/or filter 162 may be any porous material including a ceramic, metal (e.g., sintered metal), and/or polymeric material. In exemplary embodiments, the substrate 250 may provide support for the filter 162 and provide drainage for the permeate. If a substrate 250 is utilized, the substrate 250 is preferably disposed between the plate 161 and the filter 162.

A radially graded filter 162 and/or substrate 250 may be variously configured. For example, a filter 162 such as, for example, a rolled fiber metal or nylon membrane may be backed with one or more layers of backing material such as, for example, open mesh. The filter 162 and the backing material may be placed on the plate 161 such that the open mesh provides drainage for the permeate. In some embodiments, it may be desirable to roll the mesh and/or mesh/filter assembly. Different regions having the same or different number of layers of material may be rolled to different heights or to the same height. By incorporating one or more additional layers at the outer radius or rolling the outer radius to have a greater solid volume fraction, it is possible to form a filter 162 and/or substrate 250 having a radially graded permeability. For example, if a metal filter and/or backing material, e.g., a fiber metal backing or substrate material, is utilized, it may be desirable to calendar one or more layers of the backing material to different thicknesses, or to the same thickness to provide a filter element 148 having a radial gradient in the pore size or solid volume fraction, or both. Alternatively, the radially graded permeability may also be achieved by incorporating a filter 162 having a radially graded pore structure.

The permeability of the plate 161 may be modified by adjusting the permeability of the passages 163 by, for example, varying the size of the passages 163, including a permeable material in the passages 163, and/or adjusting the back-pressure on the permeate side of the filter element 148. In the case where concentric, radial, and/or other passages 163 are utilized, the depth, width, cross-section, and/or other dimensions of the grooves, channels, other passages 163 may be varied to adjust the fluid flow over different regions of the filter element 148. Different size orifices, capillaries, and/or other flow restricting devices including porous elements may be incorporated into the passages 163 in the plate 161 to vary the permeability of the filter element 148. These flow restricting devices may be molded, machined, etched, inserted into the plate 161 and/or deposited thereon sing any suitable deposition technique including chemical vapor deposition and electo-deposition. Different passages 163 or grooves may include materials having differing permeabilities. In this manner, the passages 163 in the plate 161 may be contoured to minimize back pressure on the filters 162 and balance transmembrane pressure.

Figure 4A:
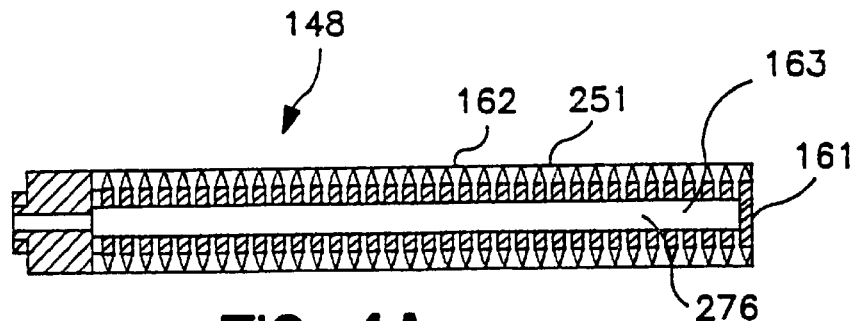
FIG. 4A is a sectioned side view.
Figure 4B:
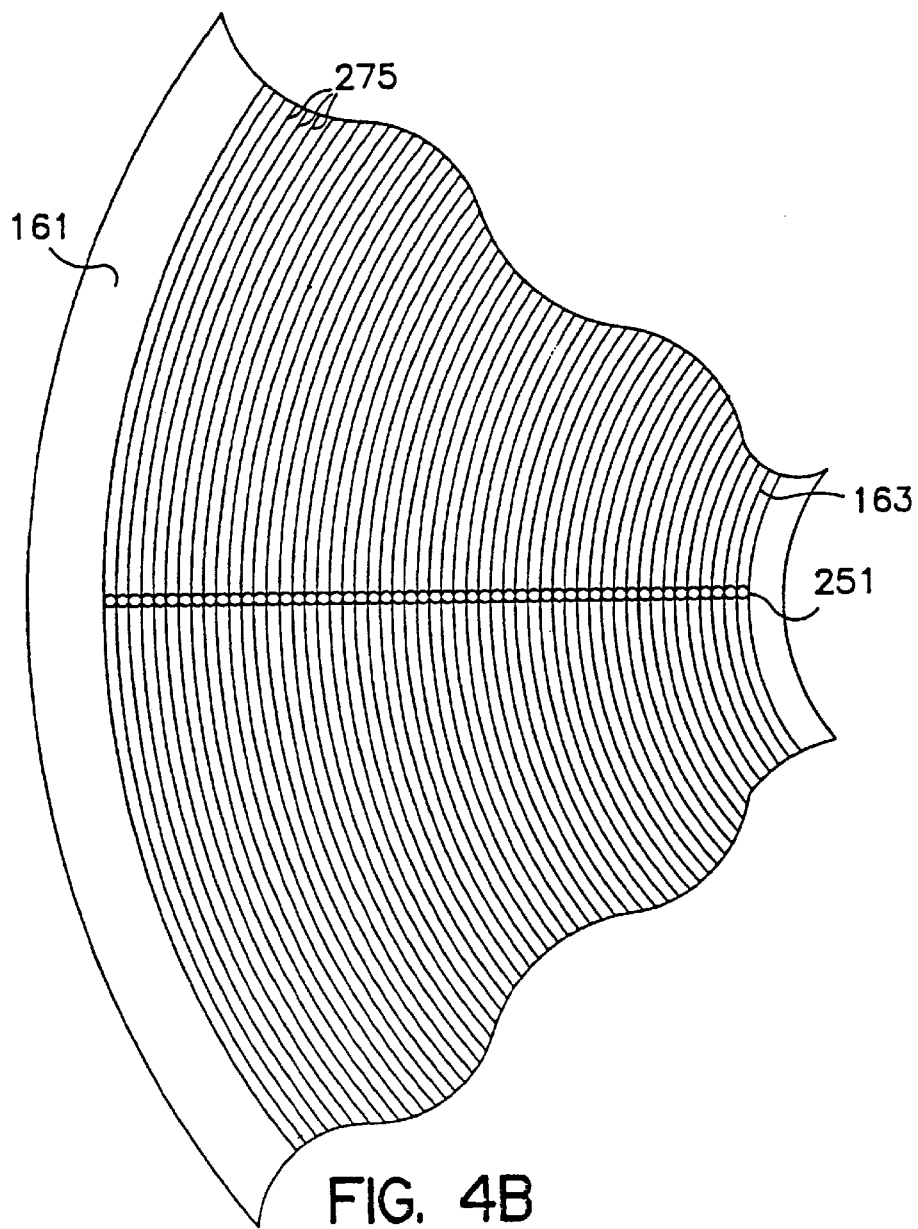
FIG. 4B is a top plan view of an exemplary embodiment of a filter element according to the present invention.

In the exemplary embodiment illustrated in FIGS. 4A and 4B, a through-hole 251 is formed between each channel 275 in the plate 161 and the radial duct 276 leading through the plate 161 to the permeate outlet 108. The through-holes 251 may have a cross section suitable for restricting the flow of fluid into the radial duct from the circumferential grooves. Further, the through-holes may be located along a single line, grouped, or dispersed throughout the filter element 148. Additionally, it may be desirable to adjust the diameters of the through-holes 251 to vary the permeability along the membrane. In an exemplary embodiment, the through-holes 251 toward the outer portion of the filter element 148 have a smaller diameter than the through-holes 251 at the inner portion of the filter element 148 so that the permeability is varied radially along the filter element. The through-holes 251 may have any configuration and may have a diameter or cross-sectional area which varies radially across the filter element 148 linearly, in a step-wise manner, and/or in a manner closely matched to the fouling of the filter 162 such that preferential fouling is substantially prevented.

Figure 5A:
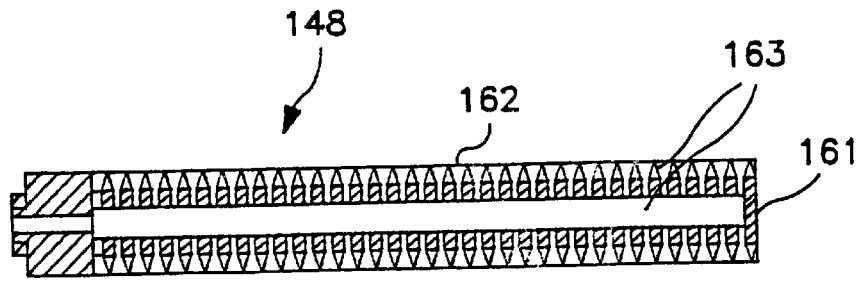
FIG. 5A is a sectioned side view.
Figure 5B:
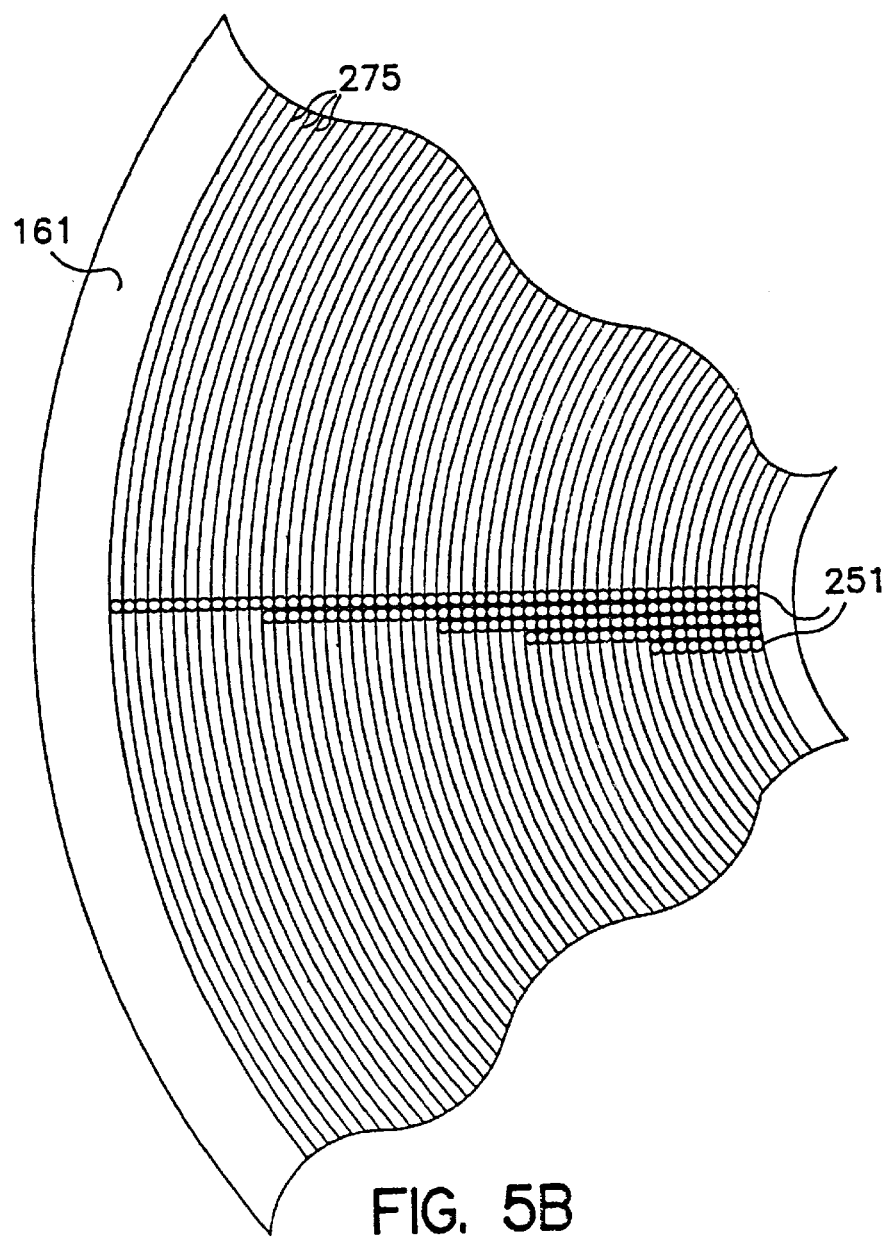
FIG. 5B is a top plan view of an exemplary embodiment of a filter element according to the present invention.

As shown in FIGS. 5A and 5B, it may be desirable to include one or more through-holes 251 having a fixed or variable size along a single circumferential groove. For example, the inner circumferential grooves may have a larger number of through-holes 251 than the outer circumferential groves. Further, it may be desirable to vary the size of the through-holes 251 associated with different circumferential grooves to provide added flexibility in varying the permeability. The size of the through-holes 251 may be determined using standard orifice and/or capillary pressure drop equations. In some embodiments, it may be sufficient to have only first and second regions of through-holes 251 with larger holes disposed at the inner portion of the filter element 148 and smaller holes disposed at the outer portion of the filter element 148.

Figure 6A:
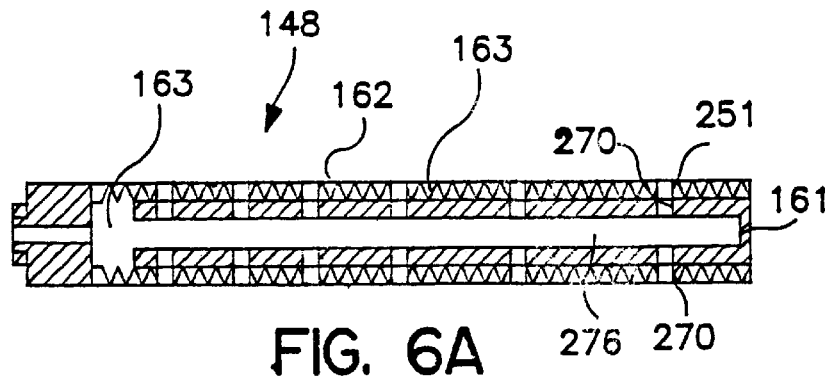
FIG. 6A is a sectioned side view.
Figure 6B:
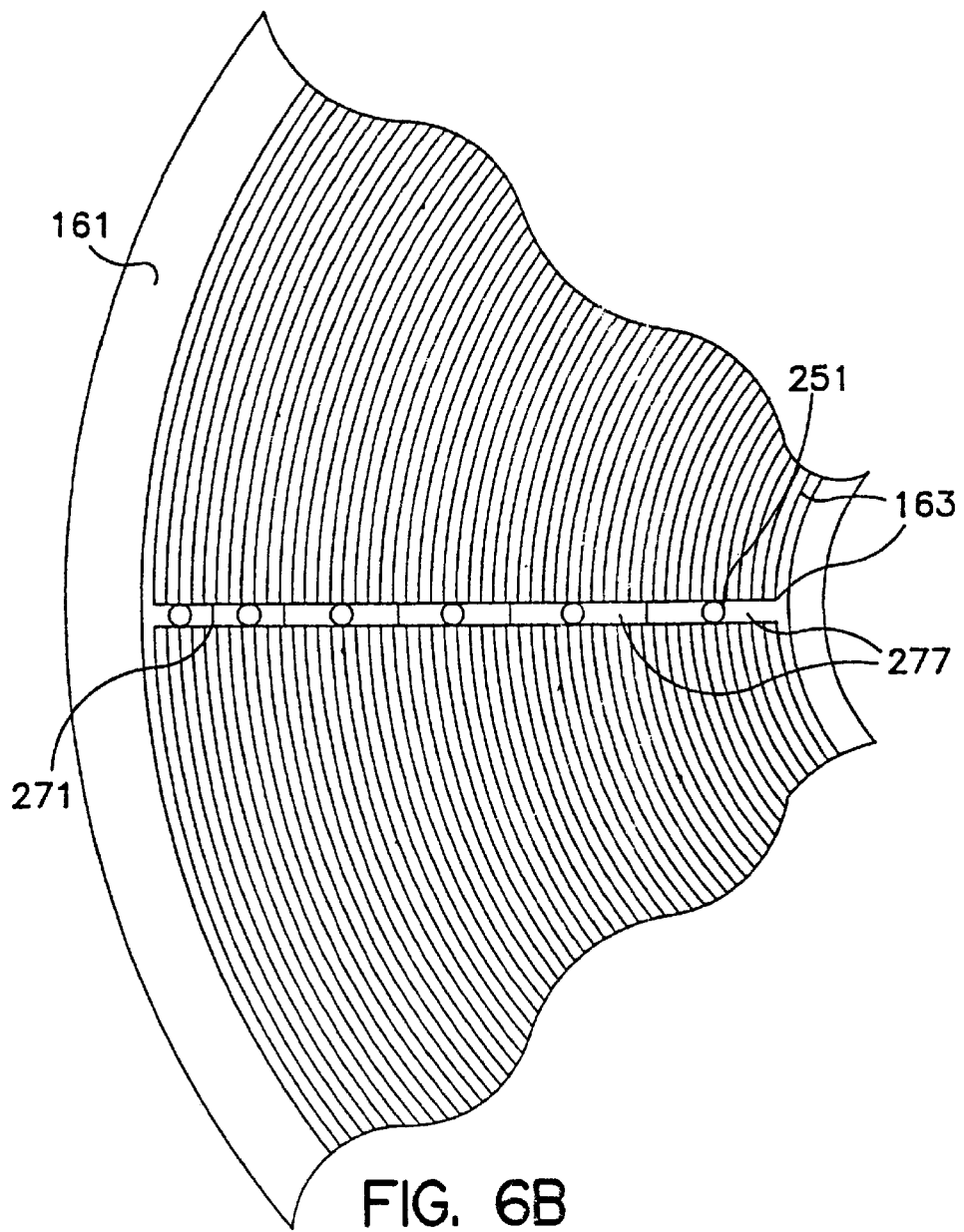
FIG. 6B is a top plan view of an exemplary embodiment of a filter element according to the present invention.

In the embodiment illustrated in FIGS. 6A and 6B, a plurality of circumferential channels are coupled together, for example, via a radial channel section 277 which in turn communicates with the duct 276 through one or more through-holes 251. In one embodiment, a plurality of circumferential grooves are in fluid communication with a single through-hole 251 in the radial channel section 277. In the illustrated embodiment, a plurality of groups of circumferential grooves respectively communicate with a plurality of radial channel sections 277. One or more barrier ribs 271 extend across the radial channel and isolate adjacent radial channel sections 277. The barrier ribs 271 may be variously configured. For example, the barrier ribs 271 may be wider and deeper than the grooves 275. Further, the barrier ribs 271 may be evenly or unevenly spaced radially across the filter element 148. If the barrier ribs 271 are unevenly spaced, it may be preferable to have the barrier ribs 271 more closely spaced toward the outer radial portions of the filter element 148 than toward the inner radial portions of the filter element 148 to more evenly adjust the permeability of the filter element 148. A finer level of adjustment may be required at the outer periphery to prevent preferential fouling.

One problem with the through-holes 251 is that the relative flow restrictions between different annular regions may require fine adjustments in the diameters of the through-holes 251. In some embodiments, the composition of the plate 161 and/or the mechanism for forming the through-holes 251, such as molding or machining may not provide a desirable level of control and reliability for adjusting the permeability across the filter element 148. Accordingly, it may be desirable to include a permeable membrane 270 in the passages 163, e.g., in the grooves, ducts, and/or through-holes 251 and/or to vary the diameters of the through-holes 251 by, for example, selectively plating the through-holes 251.

A porous element may also be utilized to vary the permeability of the filter element 148 in conjunction with or instead of varying the passages 163 in the filter element 148. For example, in the embodiments shown in FIGS. 4–6, one or more elements 270 may be inserted into the through-holes 251. The element 270 may be variously configured to include a porous material such as a porous metal (including sintered metal particles), ceramic, and/or polymeric woven or non-woven material or other permeable object. In preferred embodiments, the elements 270, which are inserted into the through-holes 251 at different radial positions, have different permeabilities to reduce preferential fouling. The element 270 may be used in conjunction with or instead of varying the diameter of the through-holes 251.

Figure 7A:
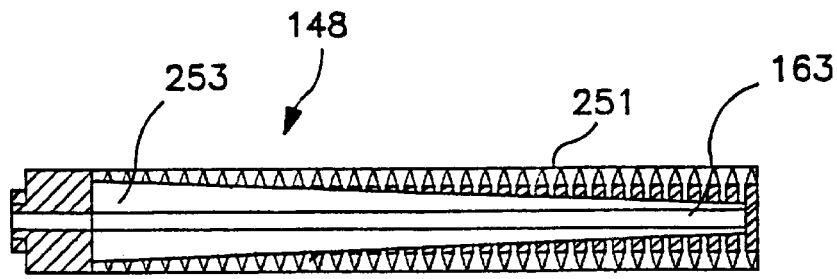
FIG. 7A is a sectioned side view.
Figure 7B:
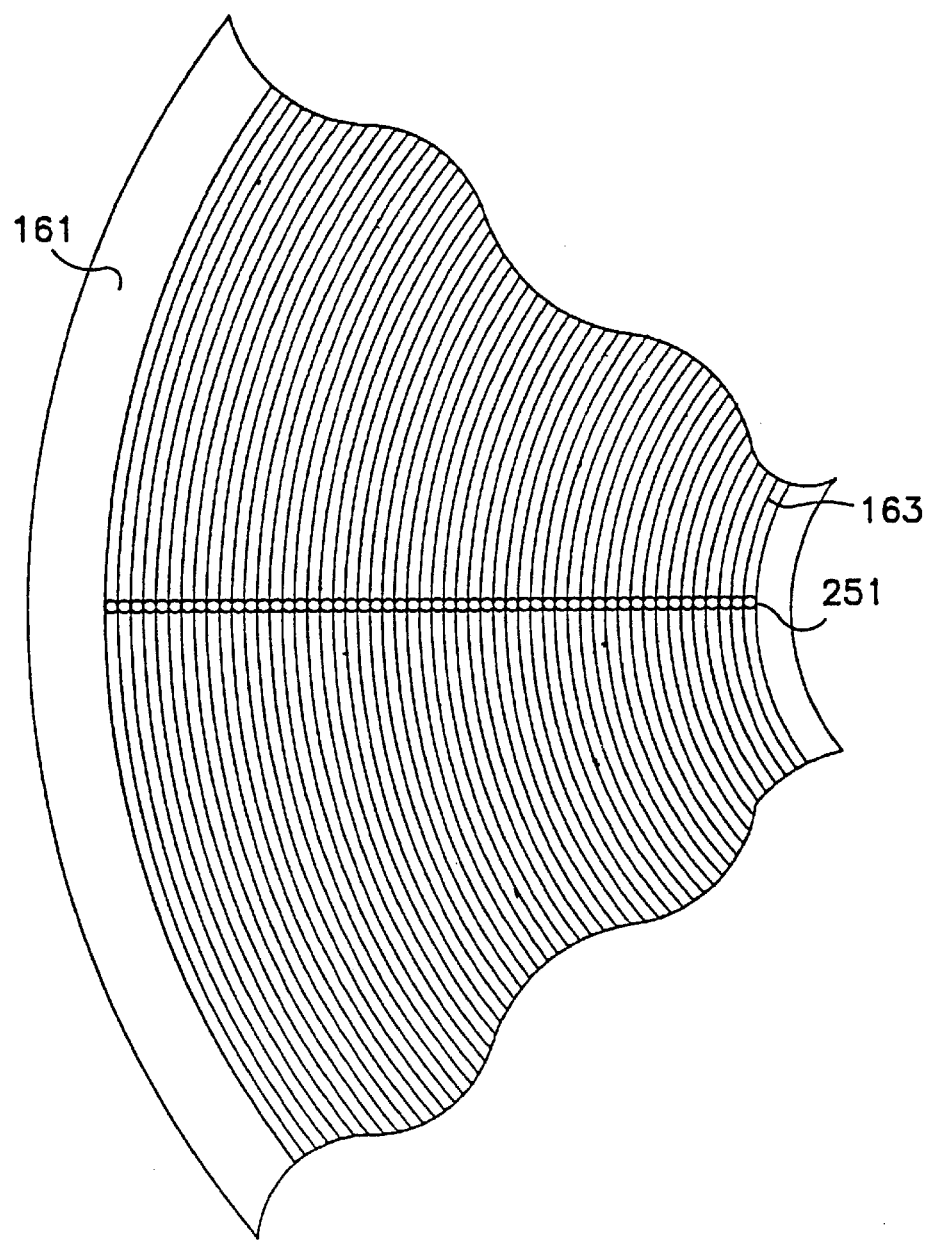
FIG. 7B is a top plan view of an exemplary embodiment of a filter element according to the present invention.

Other configurations are possible and include lacing the permeable material in the radial ducts nd/or circumferential grooves. In the embodiment illustrated in FIGS. 7A and 7B, an element 253 having a variable permeability and/or thickness is disposed in the radial duct within the filter element 148. In the embodiment shown in FIGS. 7A–7B, through-holes 251 connect the grooves to the radial duct. However, any suitable mechanism of providing fluid communication between the circumferential grooves and the duct is sufficient provided a membrane having a variable permeability is disposed therebetween.

Figure 8A:
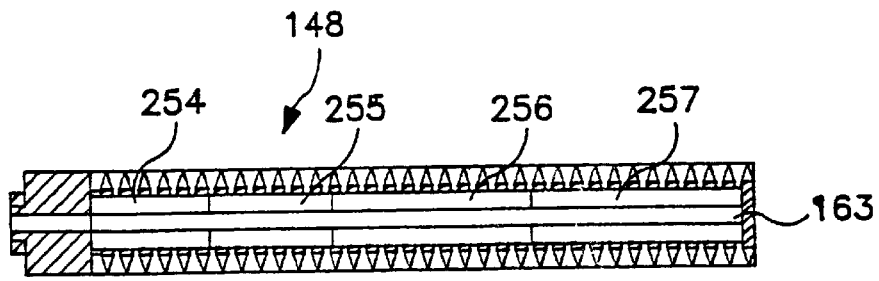
FIG. 8A is a sectioned side view.
Figure 8B:
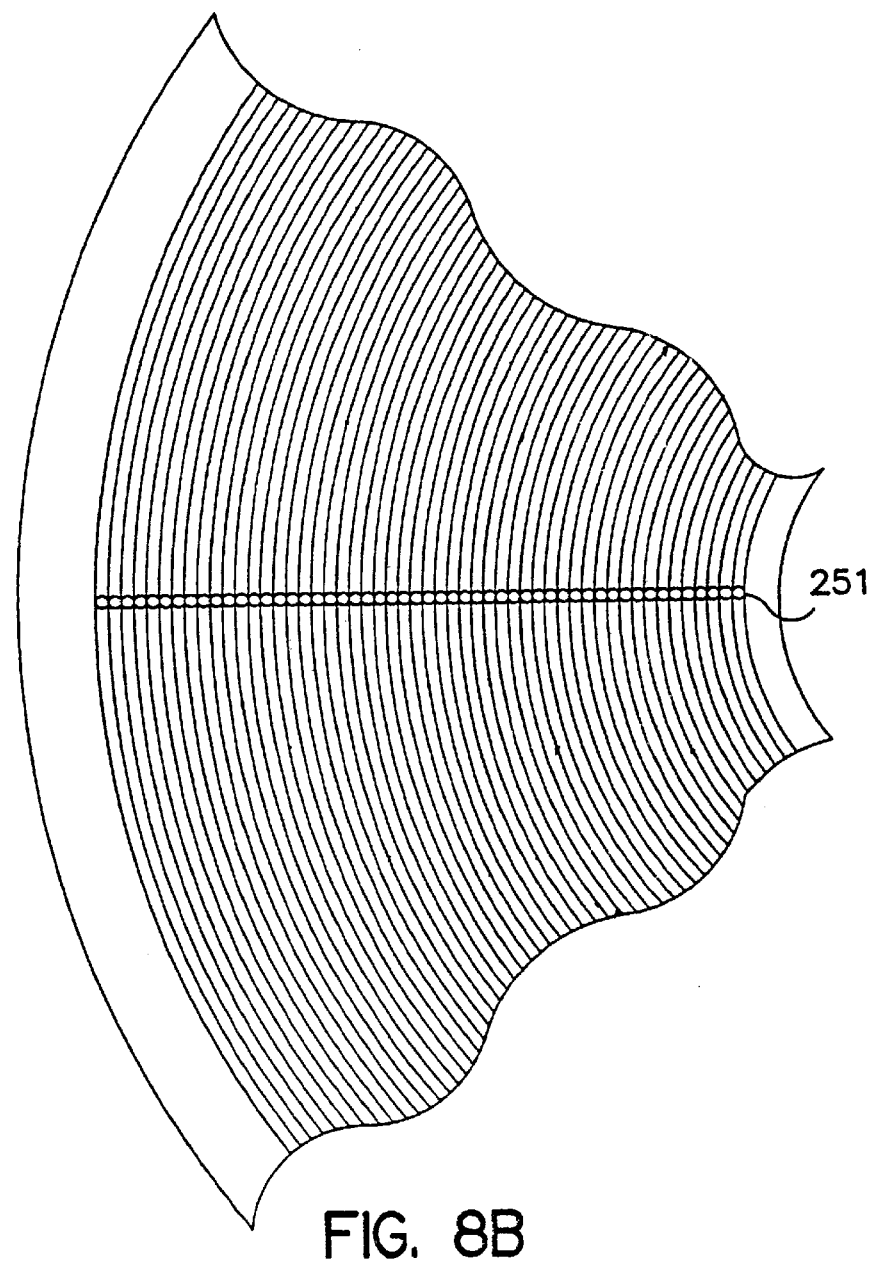
FIG. 8B is a top plan view of an exemplary embodiment of a filter element according to the present invention.
Figure 9A:
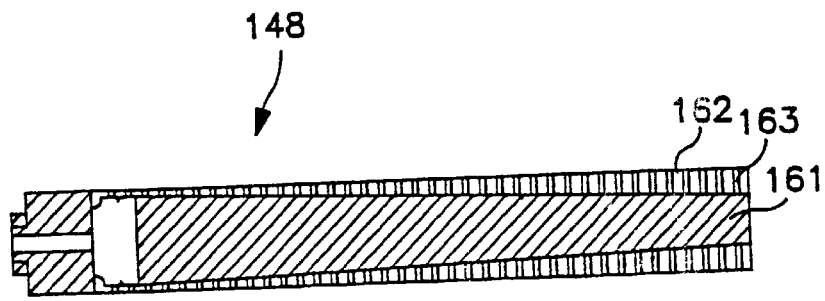
FIG. 9A is a sectioned side view.
Figure 9B:
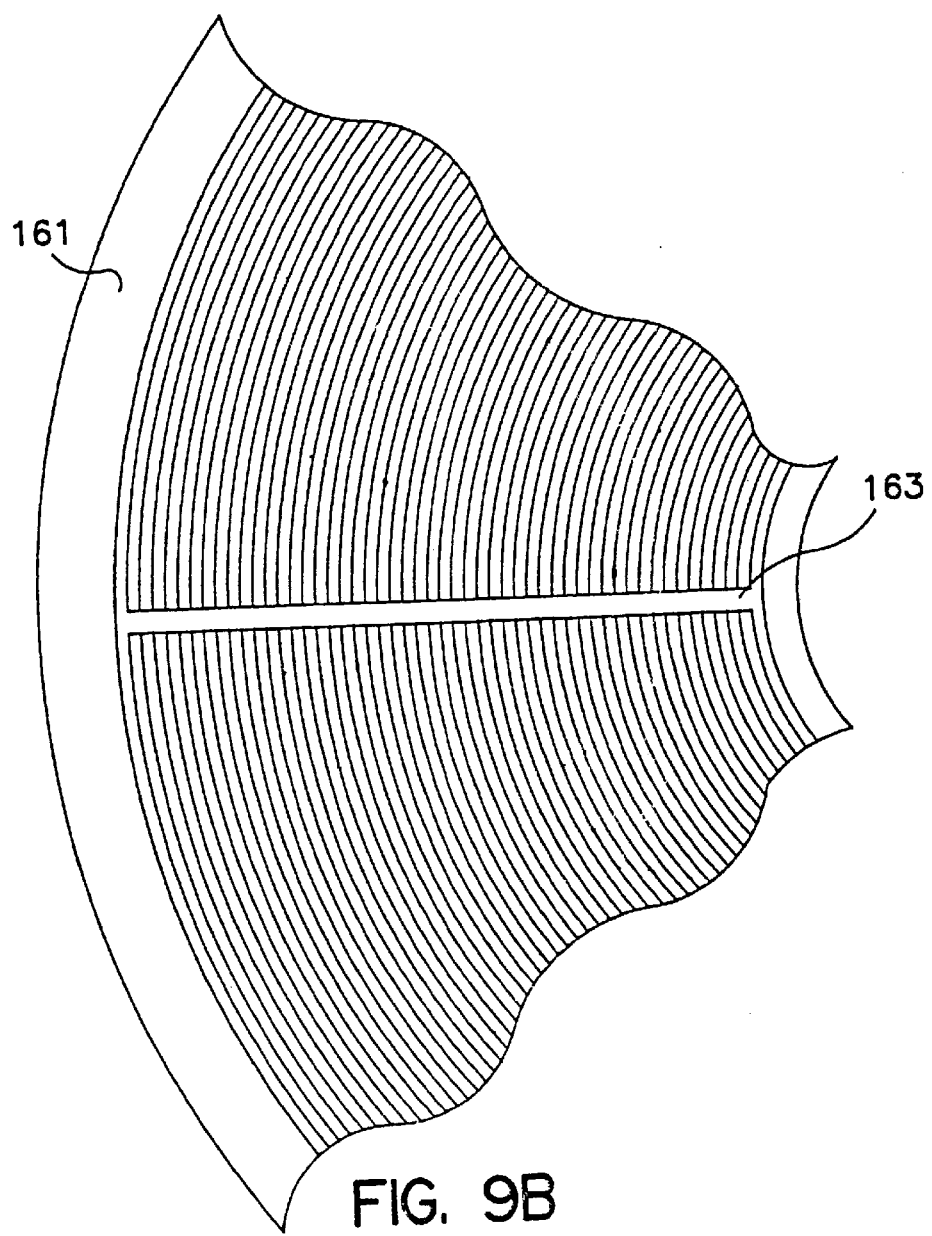
FIG. 9B is a top plan view of an exemplary embodiment of a filter element according to the present invention.
Figure 10A:
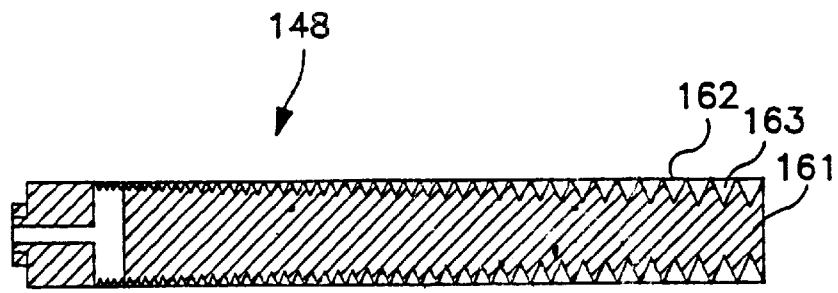
FIG. 10A is a sectioned side view.
Figure 10B:
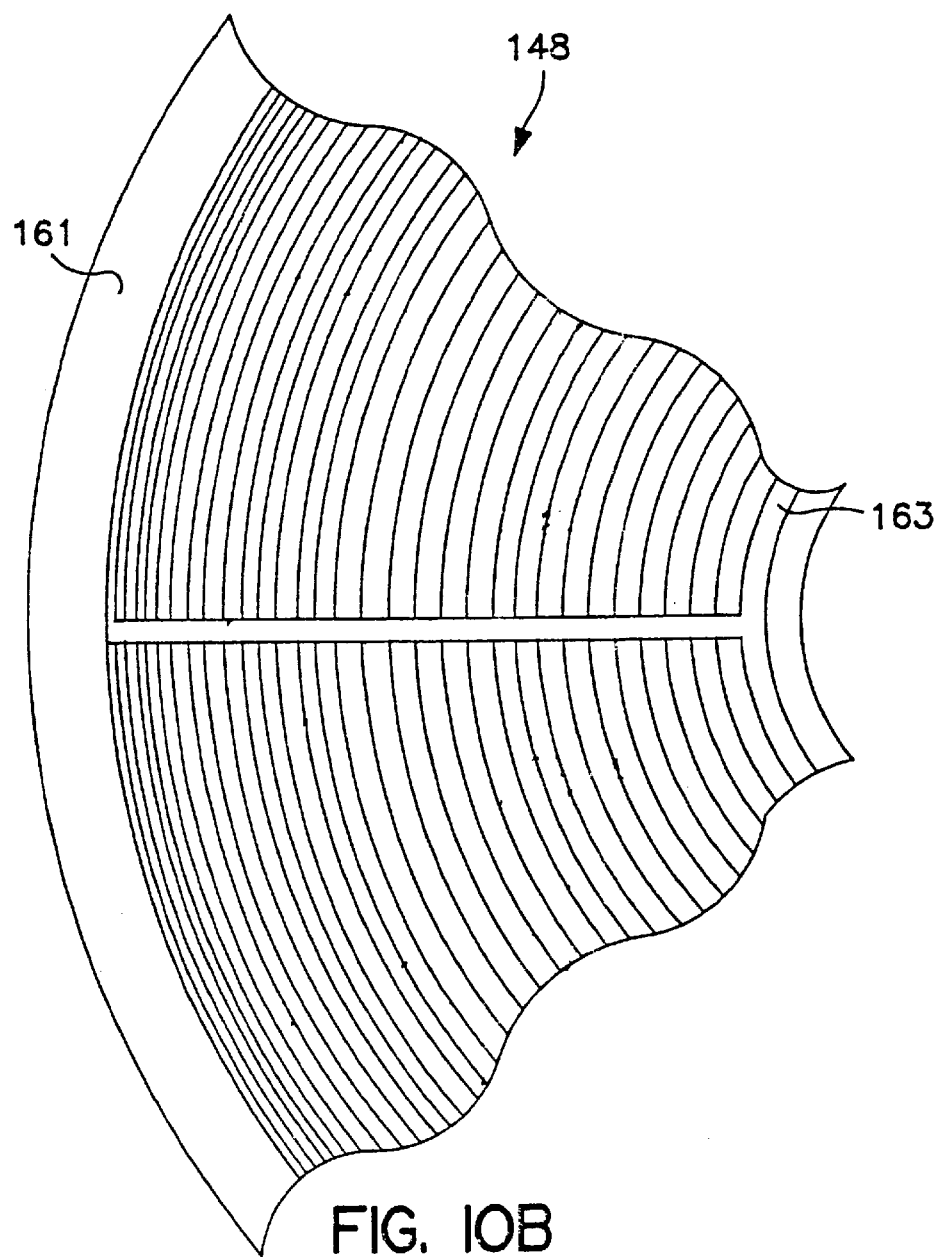
FIG. 10B is a top plan view of an exemplary embodiment of a filter element according to the present invention.

In the case of a membrane having a uniform thickness, the membrane may include a variable permeability. This may be achieved by altering the permeability of the membrane in a continuous or discontinuous manner. In the embodiment shown in FIGS. 8A and 8B, the permeability of the filter 162 is varied in a step-wise manner and includes, for example, four steps. In an exemplary embodiment, each of the four permeable sections 254–257 has a different permeability.

In some embodiments, it may be desirable to contour the grooves to vary the permeability across the filter element 148. For example, as shown in FIGS. 9A–9B and FIGS. 10A–10B, the height and/or width of the circumferential grooves may be varied in one or more locations. The height and/or width of the circumferential grooves may be varied across the entire circumferential groove or only at the portion of the circumferential groove disposed adjacent to a duct. For example, as shown in FIGS. 11A and 11B, flow restricting mechanisms 252 may be incorporated into the circumferential grooves at any suitable location, e.g., adjacent to a duct. In some embodiments, the flow restricting mechanisms may form an orifice or capillary.

Figure 12:
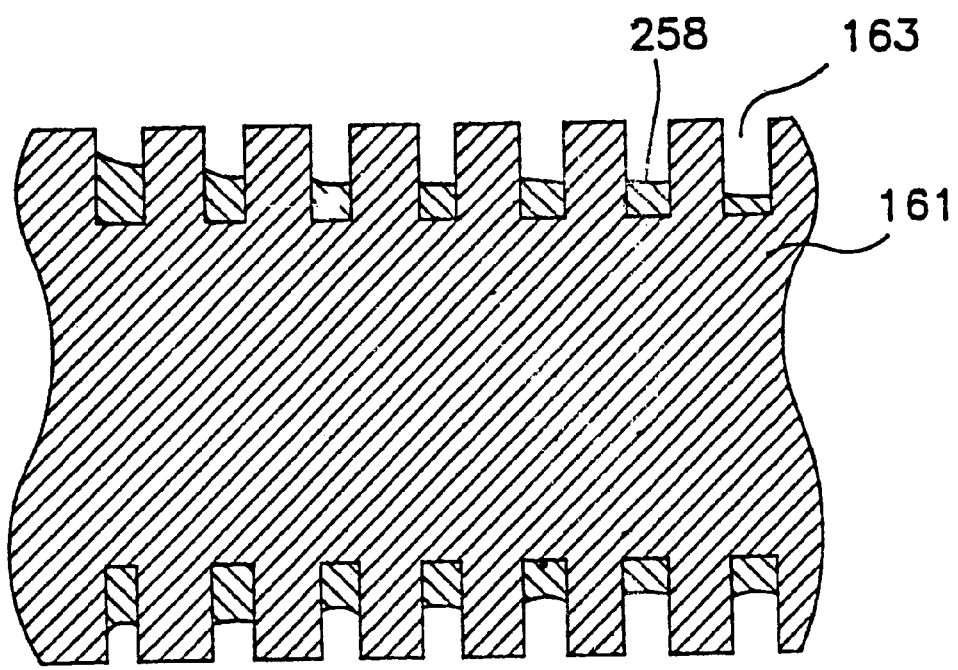
FIG. 12 is a sectioned side view of one embodiment of a filter element according to the present invention.

One problem with varying the height and/or width of one or more portions of the circumferential grooves is that the relative flow restrictions between different annular regions require very fine adjustments in the height and/or width of the passages 163 and/or other flow restricting mechanism. Accordingly, it may be desirable to deposit one or more layers of material onto one or more portions of the plate 161 and/or etch a portion of the plate 161. In the embodiment shown in FIG. 12, the flow restricting device may be deposited using any suitable deposition technique including chemical vapor deposition and electo-deposition using well known techniques. A masking operation may be required such that portions of the plate 161 are etched and/or receive a deposit while other portions of the plate 161 receive little or no deposit and/or etching. In this manner, it may be possible to exercise a fine degree of control over the permeability of the filter element 148.

The permeability of the filter element 148 may also be varied by varying the permeability of the filter 162 and/or the substrate 250. For example, as shown in the embodiments of FIGS. 13A–13B and FIGS. 14A–14B, a substrate 250 and/or filter 162 may be configured to have a uniform or variable permeability and/or a uniform or variable thickness.

Figure 13A:
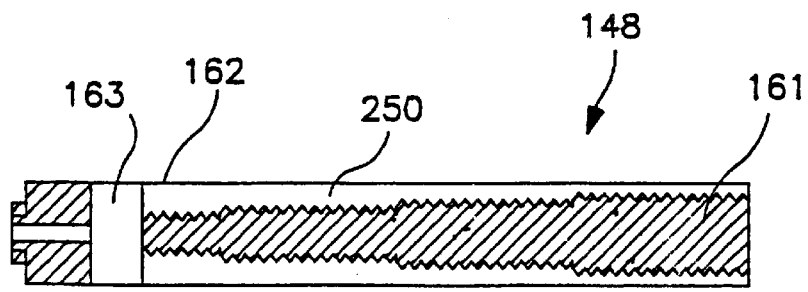
FIG. 13A is a sectioned side view.
Figure 13B:
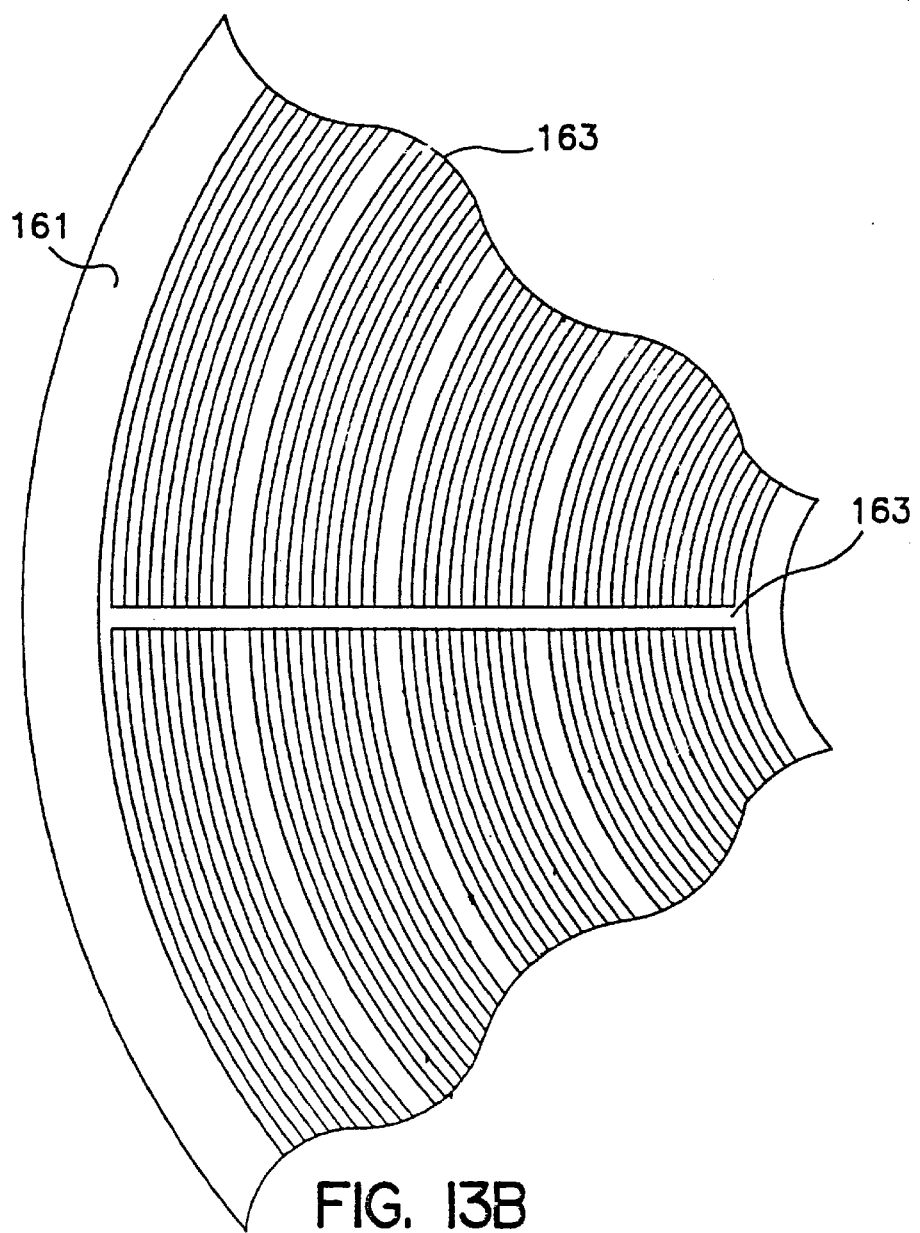
FIG. 13B is a top plan view of an exemplary embodiment of a filter element according to the present invention.
Figure 14A:
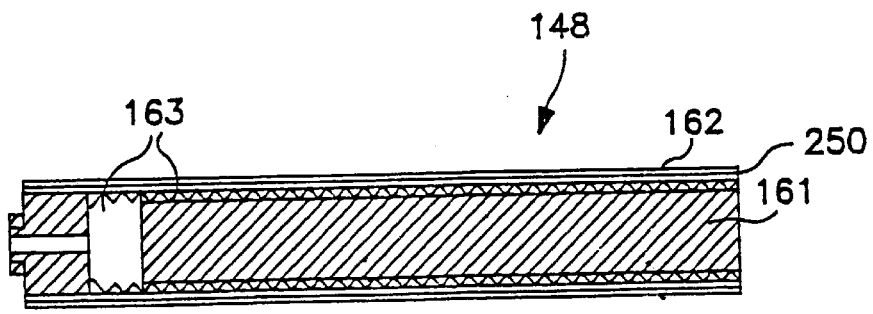
FIG. 14A is a sectioned side view and FIG. 14B is a top plan view of an exemplary embodiment of a filter element according to the present invention.
Figure 14B:
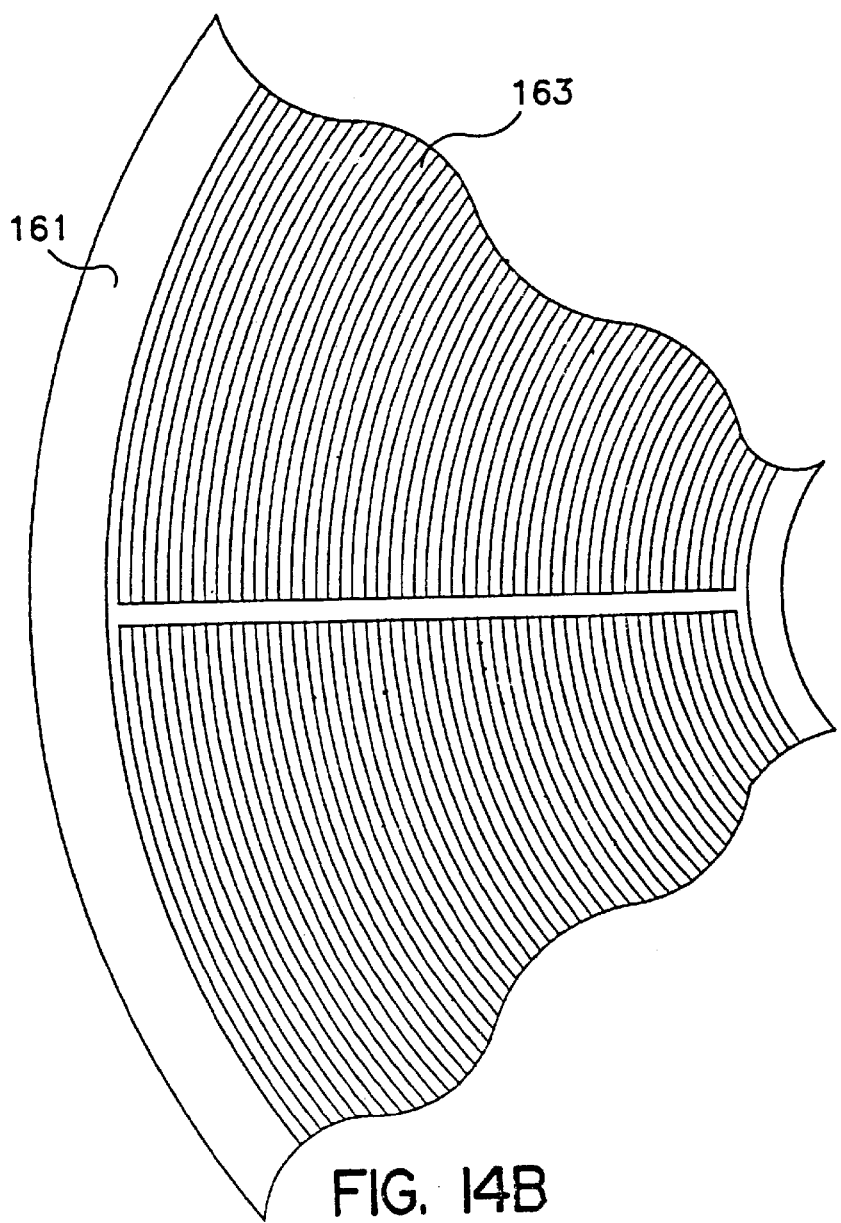

FIGS. 14A and 14B illustrate an exemplary embodiment where the substrate 250 and/or the filter 162 has a radially graded permeability and a substantially uniform thickness. Other embodiments may also be utilized to radially vary the permeability of the substrate 250. For example, in the embodiment illustrated in FIGS. 13A–13B, a substrate 250 and/or filter 162 having, for example, a uniform permeability is utilized and the thickness of the substrate 250 and/or filter 162 is varied to radially vary the permeability of the filter element 148. The thickness/permeability of the substrate 250 and/or filter 162 may be matched with the fouling mechanisms of the filter element 148 such that annular regions along the filter element 148 foul at substantially the same time. By increasing the thickness and/or permeability of the filter 162 and/or substrate 250 along the outer periphery, preferential fouling of the filter element 148 can be minimized or eliminated. Other embodiments may be variously configured. For example, a uniform thickness and/or variable thickness plate 161 may be utilized with a uniform and/or variable thickness substrate 250 and/or filter 162. Further, the thickness of the filter 162, substrate 250, and/or plate 161 may be varied linearly, step-wise, exponentially, or in a manner to closely match the fouling characteristics of the filter element 148.

If a step-wise permeability adjustment in the filter 162 and/or substrate 250 is utilized, one or more annular regions having differing permeabilities may be included. In the embodiment shown in FIGS. 13A–13B, there are four different annular regions having differing permeabilities. The differing permeabilities are achieved using a filter 162 and/or substrate 250 having differing thicknesses. However, a single thickness filter 162 and/or substrate 250 may also be utilized as shown in FIGS. 14A–14B. The step-wise regions may be larger along the inner radius and smaller at the outer radius. For example, for a sixteen inch outer diameter element, the steps at the outer radius may be 0.1 to 2.0 inches, and preferably 0.3 to 1.0 inches and most preferably about 0.5 inches. At the inner radius, the steps may be between 0.5 and 6 inches and preferably between 1.0 and 3 inches and most preferably about 2 inches.

In the embodiments illustrated in FIGS. 13A and 14A, the substrate 250 and/or filter 162 may be a single element or different elements. If different elements are utilized, it may be desirable to form the elements as annular discs and bind the elements together forming an integral substrate 250 and/or filter 162.

In some embodiments, a resin or other material may be impregnated into different portions of the substrate 250 and/or filter 162 to vary the permeability. For example, the permeability of the filter 162 and/or substrate 250 may be intentionally altered in the manufacturing process and/or while in operation by intentionally fouling and/or impregnating the membrane. Larger flows at the outer periphery of the filter element 148 cause fouling and/or impregnation to first occur at the outer portion of the filter elements 148. Thus, it is possible to intentionally foul and/or impregnate the filters 162 and/or substrate 250 to a predetermined level which substantially balances the transmembrane pressure so that further fouling occurs evenly across the filter element 148.

If the filter 162 and/or substrate 250 is to be intentionally fouled while in operation, it may be desirable to operate at a speed less than the operational speed so that a removable layer of particles is built-up on the filter element 148. In some embodiments, a predetermined fouling layer is built-up until a stabilization point is reached. The fouling of the filter 162 and/or substrate 250 occurs more at the outer portion of the filter elements 148 and less along the inner portion of the filter elements 148. When this occurs, the permeability of the filter 162 and/or substrate 250 can be substantially matched to prevent preferential fouling.

Additionally, it may be undesirable to bring the members 151 completely up to operational speed while the permeate valve is shut because the filter elements 148 may become fouled due to the recirculating flow and/or damaged due to the back-pressure. Accordingly, an exemplary start-up procedure determines one or more critical levels of relative rotation at which the filter elements 148 either become fouled or damaged with the permeate valve closed or partially closed. The start-up procedure then limits the relative rotation to be less than the critical value for any given position of the permeate valve.

The critical rotational level is a function of the disc diameter, type of process fluid, and other factors that effect the level of back-pressure or shearing. For example, for 14–22" inch members 151, it may be desirable to limit the relative rotation between the filter elements 148 and the members 151 to, for example, between 400 and 800 rpm before opening of the permeate valve is initiated. At these levels, there is typically enough shear force acting on the particles to initiate some degree of lift counteracting the motion of the process fluid (including the particles) flowing towards the filter elements 148. Once this interim equilibrium position is reached, the relative rotation may be increased to operational speeds and the permeate valve opened in one or more continuous or discontinuous steps. In some embodiments, once the equilibrium position is reached, it may be desirable to maintain a ratio between the relative rotation and the permeate valve opening. In one embodiment, the spin rate and permeate valve are opened in three steps at around 600 rpm, 1100 rpm and at 1800 rpm.

While exemplary dynamic filter assemblies embodying the present invention are shown, it will be understood, of course, that the invention is not limited to these embodiments. Modification may be made by those skilled in the art, particularly in light of the foregoing teachings. It is, therefore, intended that the appended claims cover any such modifications which incorporate the features of this invention or encompass the true spirit and scope of the invention. For example, each of the aforementioned embodiments may be utilized alone or in combination with other embodiments. Further, the filter elements, substrates, and passages are not limited to the embodiments shown and are intended to cover different sizes, shapes, and even the omission of one or more components shown in the embodiments contained herein.

Additionally, the devices and methods illustrated herein may be utilized to vary the permeability over any region of the filter elements and include reducing the permeability at both the inner and/or the outer radius of the filter elements.

We claim:

1. A dynamic filter assembly comprising:
an inlet;
an outlet;
a housing defining a fluid flow path between the inlet and outlet;
a filter element having a central axis disposed within the housing in the fluid flow path and dividing the fluid flow path into a process fluid flow path communicating with the inlet and a permeate fluid flow path communicating with the outlet, the filter element including at least one filter having a generally planar upstream side extending substantially perpendicular to said central axis and a downstream side and a mechanism disposed downstream of the filter in the permeate fluid flow path to restrict permeate fluid flow to radially vary a permeability of the filter element such that said permeability generally decreases with increasing radial distance from the central axis of the filter element to resist preferential fouling of a radially outer portion of the filter element; and
a member disposed within the housing facing the filter element, wherein said member is rotatably mounted allowing relative rotation of the member in relation to the filter element to resist fouling of the filter element.

2. The dynamic filter assembly of claim 1 including a plurality of filter elements and a plurality of members, the filter elements and members being interleaved and arranged to rotate relative to one another.

3. The dynamic filter assembly of claim 1, wherein the permeability of the filter element is varied radially in a stepwise manner.

4. The dynamic filter assembly of claim 1, wherein the permeability of the filter element in a radially inner region of the filter element is greater than that in a radially outer region of the filter element.

5. The dynamic filter assembly of claim 1, wherein the mechanism includes a plurality of holes.

6. The dynamic filter assembly of claim 1, wherein the mechanism includes a plurality of holes, and the permeability of the filter element is varied radially by varying, the size of the holes.

7. The dynamic filter assembly of claim 1, wherein the mechanism includes a plurality of holes, and the holes include capillaries.

8. The dynamic filter assembly of claim 1, wherein the mechanism includes a plurality of holes, and the holes include orifices.

9. The dynamic filter assembly of claim 1, wherein the mechanism includes a plurality of holes, and the filter element includes a plurality of circumferential grooves disposed downstream of the filter in the permeate flow path, and wherein at least one of the through holes is disposed in each of the circumferential grooves and restricts permeate fluid flow therein.

10. The dynamic filter assembly of claim 9, wherein the permeability of the filter element is varied by varying the number of through holes from one circumferential groove to another circumferential groove.

11. The dynamic filter assembly of claim 9, wherein the permeability of the filter element is varied by varying the size of the holes from one circumferential groove to another circumferential groove.

12. The dynamic filter assembly of claim 1 wherein the filter element includes a plate defining first and second annular regions in the permeate fluid flow path and wherein the mechanism includes first and second flow restricting mechanisms disposed in the permeate fluid flow path in fluid communication with the first and second annular regions, respectively.

13. The dynamic filter assembly of claim 12, wherein the first and second annular regions are radially spaced from one another and wherein each of the first and second annular regions includes at least one circumferential groove in the plate and each of the first and second flow restricting mechanisms includes at least one through hole.

14. The dynamic filter assembly of claim 13, wherein the permeability of the filter element is varied by varying the number of holes from one annular region to another annular region.

15. The dynamic filter assembly of claim 13, wherein the permeability of the filter element is varied by varying the size of the holes from one annular region to another annular region.

16. The dynamic filter assembly of claim 13, wherein the filter element includes at least one radially extending passage in the permeate flow path having first and second sections, the first and second sections being in fluid communication with the first and second annular regions, respectively, the first and second flow restricting mechanisms being disposed in the first and second sections, respectively.

17. The dynamic filter assembly of claim 16, wherein the length of a section in a radially outer region is less than the length of a section in a radially inner region.

18. The dynamic filter assembly of claim 12, wherein each of the first and second flow restricting mechanisms includes a permeable element, and the permeability of the filter element is varied by varying the flow resistance of the permeable elements.

19. The dynamic filter assembly of claim 12, wherein the filter element includes at least one radially extending duct in the permeate flow path having first and second sections, the first and second sections being in fluid communication with the first and second annular regions, respectively, and wherein the first and second flow restricting mechanisms each include a permeable element disposed in the first and second sections, respectively.

20. The dynamic filter assembly of claim 19, wherein the permeability of the filter element is varied by varying the permeability of the permeable elements from one section to another section.

21. The dynamic filter assembly of claim 19, wherein the length of a section in a radially outer region is less than the length of a section in a radially inner region.

22. The dynamic filter assembly of claim 1, wherein the filter element includes a plurality of circumferential grooves disposed downstream of the filter in the permeate flow path, and the permeability of the filter element is varied by varying the size of the grooves.

23. The dynamic filter assembly of claim 22, wherein the size of the grooves is varied by varying the height of the grooves.

24. The dynamic filter assembly of claim 22, wherein the size of the grooves is varied by varying the width of the grooves.

25. The dynamic filter assembly of claim 22, wherein the filter element includes at least one radially extending duct in fluid communication with the grooves, and wherein the mechanism further includes a permeable element disposed in the duct, and the permeability of the filter element is varied by varying the permeability of the permeable element.

26. The dynamic filter assembly of claim 1, wherein the mechanism includes at least one permeable element.

27. The dynamic filter assembly of claim 26 wherein the filter element includes one or more permeate passages in the permeate flow path and the mechanism includes a plurality of permeable elements disposed in the one or more permeate passages, the permeability of the filter element being varied by varying the flow resistance of the permeable elements.

28. The dynamic filter assembly of claim 1, wherein the mechanism includes at least one permeable element, and the permeability of the filter element is varied by varying the permeability of the permeable element.

29. The dynamic filter assembly of claim 1, wherein the mechanism includes at least one permeable element, and wherein the permeability of the filter element is varied by varying the thickness of the permeable element.

30. The dynamic filter assembly of claim 1, wherein the mechanism includes at least one permeable element, and wherein the permeability of the filter element is varied by varying the solid volume fraction of the permeable element.

31. The dynamic filter assembly of claim 1, wherein the mechanism includes at least one permeable element, and wherein the permeability of the permeable element is varied by varying the pore size of the permeable element.

32. The dynamic filter assembly of claim 1, wherein the mechanism includes at least one permeable element, and wherein the permeable element includes a plurality of layers, the permeability of the filter element being varied by varying the number of layers of the permeable element.

33. The dynamic filter assembly of claim 1, wherein the mechanism includes at least one permeable element, and the permeability of the filter element is varied by varying the permeability of the permeable element, the permeability of the permeable element being varied in a stepwise manner.

34. The dynamic filter assembly of claim 1, wherein the mechanism includes at least one permeable element, and the permeability of the filter element is varied by varying the permeability of the permeable element, the permeability of the permeable element in a radially inner region being greater than that in a radially outer region.

35. The dynamic filter assembly of claim 1, wherein the filter element includes a plate, and the mechanism includes at least one substrate disposed between the plate and the filter, and wherein the permeability of the filter element is varied by varying the permeability of the substrate.

36. The dynamic filter assembly of claim 35, wherein the permeability of the substrate is varied by varying the thickness of the substrate.

37. The dynamic filter assembly of claim 36, wherein the thickness of the substrate is varied in a stepwise manner.

38. The dynamic filter assembly of claim 36, wherein the substrate in a radially outer region is thicker than that in a radially inner region.

39. The dynamic filter assembly of claim 35, wherein the permeability of the substrate is varied by varying the solid volume fraction of the substrate.

40. The dynamic filter assembly of claim 35, wherein the permeability of the substrate is varied by varying the pore size of the substrate.

41. A filter element for use in a dynamic filter system having a spinning body of process fluid, the filter element comprising a central axis and a filter including a generally planar upstream side extending substantially perpendicular to said central axis for contacting said spinning body of process fluid and a downstream side for outputting permeate fluid along a permeate fluid flow path, and a mechanism disposed downstream of the filter in the permeate fluid flow path for radially varying a permeability of the filter element to permeate fluid flow such that said permeability generally decreases with increasing radial distance from the central axis of the filter element to resist preferential fouling of a radially outer portion of the filter element.

42. The filter element of claim 41, wherein the permeability of the filter element is varied radially in a stepwise manner.

43. The filter element of claim 41, wherein the permeability of the filter element in a radially inner region of the filter element is greater than that in a radially outer region of the filter element.

44. The filter element of claim 41, wherein the mechanism includes a plurality of holes.

45. The filter element of claim 41, wherein the mechanism includes a plurality of holes, and wherein the permeability of the filter element is varied by radially varying the size of the holes.

46. The filter element of claim 23, wherein the mechanism includes a plurality of holes, wherein the filter element includes a plurality of circumferential grooves disposed downstream of the filter in the permeate flow path, and wherein at least one of the through holes is disposed in each of the circumferential grooves and restricts permeate fluid flow therein.

47. The filter element of claim 41, wherein the mechanism includes at least one permeable element.

48. The filter element of claim 47, wherein the permeability of the filter element is varied by varying the permeability of the permeable element.

49. The filter element of claim 48, wherein the permeability of the permeable element is varied by radially varying the thickness of the permeable element.

50. The filter element of claim 48, wherein the permeable element includes a plurality of layers and wherein the permeability of the permeable element is varied by varying the number of layers of the permeable element.

51. The filter element of claim 48, wherein the filter element includes a plate and wherein the permeable element includes a substrate disposed between the plate and the filter.

52. The filter element of claim 51, wherein the permeability of the substrate is varied by radially varying the permeability of the substrate.

53. The filter element of claim 41, wherein the filter element includes one or more permeate passages in the permeate flow path, and wherein the mechanism includes a plurality of permeable element disposed in the one or more permeate passages, the permeability of the filter element being varied by varying the flow resistance of the permeable elements.

54. The filter element of claim 41, wherein the filter element includes a plurality of circumferential grooves disposed downstream of the filter in the permeate flow path, and the permeability of the filter element is varied by varying the size of the grooves.

55. The filter element of claim 41, further comprising a plate having a plurality of permeate passages in the permeate flow path, the filter being disposed on the plate, and wherein the mechanism comprises one or more flow restrictions coupled to the permeate passages.

56. The filter element of claim 41 further comprising a plate defining first and second annular regions in the permeate fluid flow path and wherein the mechanism includes first and second flow restricting members disposed in the permeate fluid flow path in fluid communication with the first and second annular regions, respectively.

57. The filter element of claim 56, wherein the first and second annular regions are radially spaced from one another, and wherein each of the first and second annular regions includes at least one circumferential groove and each of the first and second flow restricting mechanisms includes at least one hole.

58. The filter element of claim 57, wherein the filter element includes at least one radially extending passage in the permeate flow path having first and second sections, the first and second sections being in fluid communication with the first and second annular regions, respectively, the first and second flow restricting mechanisms being disposed in the first and second sections, respectively.

59. The filter element of claim 56, wherein the filter element includes at least one radially extending passage in the permeate flow path having first and second sections, the first and second sections being in fluid communication with the first and second annular regions, respectively, and wherein the first and second flow restricting mechanisms each include a permeable element and are disposed in the first and second sections, respectively.

60. The filter element of claim 59, wherein the permeability of the filter element is varied by varying the permeability of the permeably elements from one section to another section.

* * * * *